(12) United States Patent
Chikuma et al.

(10) Patent No.: US 6,729,710 B2
(45) Date of Patent: May 4, 2004

(54) INK JET RECORDING APPARATUS AND METHOD WITH REDUCED BANDING

(75) Inventors: Toshiyuki Chikuma, Kawasaki (JP); Naoji Otsuka, Yokohama (JP); Tsutomu Takahashi, Kawasaki (JP); Kiichiro Takahashi, Kawasaki (JP); Hitoshi Nishikori, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/966,249

(22) Filed: Oct. 1, 2001

(65) Prior Publication Data

US 2002/0039122 A1 Apr. 4, 2002

(30) Foreign Application Priority Data

Sep. 29, 2000 (JP) .......................... 2000/300186

(51) Int. Cl.[7] .................. B41J 29/38; B41J 2/145; B41J 2/15
(52) U.S. Cl. ................. 347/14; 347/41; 347/12
(58) Field of Search .................. 347/12, 41, 14

(56) References Cited

U.S. PATENT DOCUMENTS

| 4,313,124 A | 1/1982 | Hara ........................... 347/57 |
| 4,345,262 A | 8/1982 | Shirato et al. ................. 347/10 |
| 4,459,600 A | 7/1984 | Sato et al. .................... 347/47 |
| 4,463,359 A | 7/1984 | Ayata et al. ................... 347/56 |
| 4,723,129 A | 2/1988 | Endo et al. .................... 347/56 |
| 4,740,796 A | 4/1988 | Endo et al. .................... 347/56 |
| 5,373,368 A | * 12/1994 | Taniguro ..................... 358/296 |
| 5,384,587 A | * 1/1995 | Takagi et al. .................. 347/41 |
| 5,608,439 A | * 3/1997 | Arbeiter et al. ............. 347/102 |
| 5,975,678 A | 11/1999 | Kanematsu et al. ........... 347/43 |
| 6,102,511 A | 8/2000 | Shioya et al. ................... 347/9 |
| 6,164,756 A | 12/2000 | Takahashi et al. ............. 347/43 |

FOREIGN PATENT DOCUMENTS

| JP | 54-56847 | 5/1979 | ............ B41M/5/26 |
| JP | 59-123670 | 7/1984 | ............ B41J/3/004 |
| JP | 59-138461 | 8/1984 | ............ B41J/3/004 |
| JP | 60-71260 | 4/1985 | ............ B41J/3/004 |

* cited by examiner

Primary Examiner—Benjamin R. Fuller
Assistant Examiner—Alfred E Dudding
(74) Attorney, Agent, or Firm—Fitzpatrick, Cella, Harper & Scinto

(57) ABSTRACT

An ink jet recording apparatus for effecting recording on a recording material by ejecting ink through a plurality of ejection outlets in units of band with relative scanning movement between a recording head and the recording material, the ink jet recording apparatus, includes obtaining means for obtaining scanning interval information relating to time period required for recording a connecting portion between a band of a certain scan of the recording head and a band of the next scan of the recording head; and reducing means for reducing an amount of the ink shot to a neighborhood of the connecting portion on the basis of the scanning interval information obtained by the obtaining means.

17 Claims, 22 Drawing Sheets

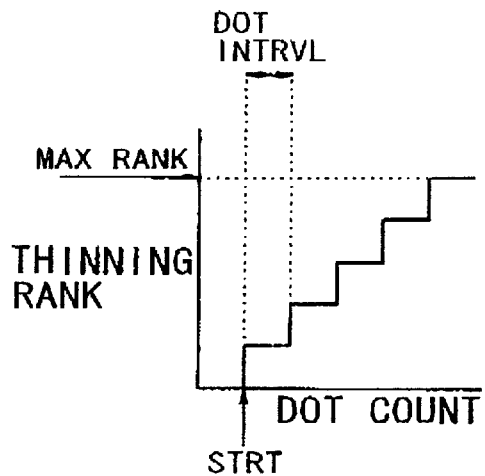
FIG. 10A
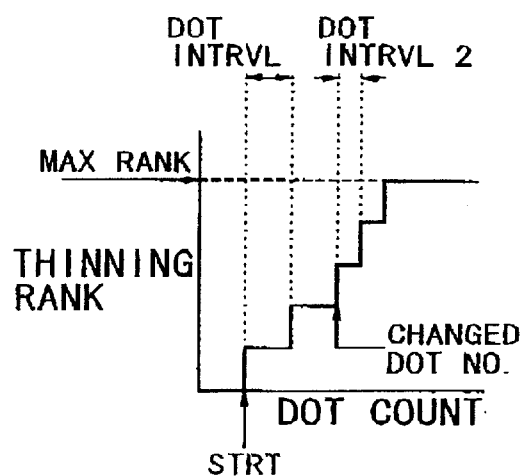
FIG. 10B
| THINNING LVL | COUNT | THINNING RATIO |
|---|---|---|
| 0 | 11111111 | 0/8=0% |
| 1 | 01111111 | 1/8=12.5% |
| 2 | 01110111 | 2/8=25% |
| 3 | 01010111 | 3/8=37.5% |
| 4 | 01010101 | 4/8=50% |
| 5 | 00010101 | 5/8=62.5% |
| 6 | 00010001 | 6/8=75% |
| 7 | 00000001 | 7/8=87.5% |
| 8 | 00000000 | 8/8=100% |
FIG. 11

FIG. 12A — CYAN UPPER
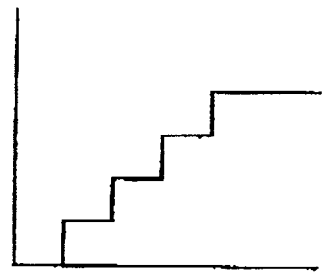
FIG. 12B — CYAN LOWER
FIG. 12C — MAGENTA UPPER
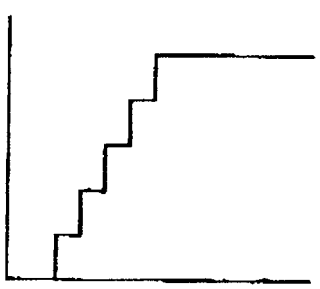
FIG. 12D — MAGENTA LOWER
FIG. 12E — YELLOW UPPER
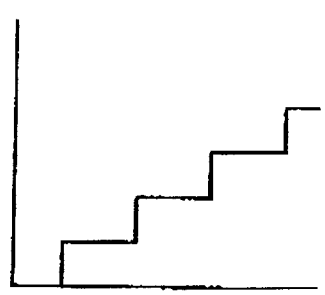
FIG. 12F — YELLOW LOWER (PRINT DATA) (COUNT)

○ × ○ ○ ○ × ○ × × × ○ ○ ×  01110111
ORGNL DATA

FIG. 14A

[1ST PRINT DATA]
BEFORE TREATMENT
○ × ○ ○ ○ × ○ × × × ○ ○ ×  01110111
AFTER TREATMENT
× × ○ ○ ○ × ○ × × × ○ ○ ×  11101110

FIG. 14B

[2ND PRINT DATA]
BEFORE TREATMENT
× × ○ ○ ○ × ○ × × × ○ ○ ×  11101110
AFTER TREATMENT
× × ○ ○ ○ × ○ × × × ○ ○ ×  11101110

FIG. 14C

[SMS TREATMENT]
ORGNL DATA
○ × ○ ○ ○ × ○ × × × ○ ○ ×
TREATED DATA
× × ○ ○ ○ × × × × × ○ ○ ×

FIG. 14D

(PRINT DATA)　　　(COUNT)

DISCHARGE SIDE

1ST RSTR　　OO××O×OO ── 01110111
2ND RSTR　　OO××O×O×
3RD RSTR　　OO××O×OO ── 01010101
4TH RSTR　　OO××O×OO

INLET SIDE

FIG. 15A

[1ST RSTR]
　BEFORE TREATMENT
　　　　OO××O×OO　　　01110111
　AFTER TREATMENT
　　　　×O××O×O×　　　11101110

FIG. 15B

[2ND RSTR]
　BEFORE TREATMENT
　　　　OO××O×O×　　　11101110
　AFTER TREATMENT
　　　　OO××O×××　　　11101110

FIG. 15C

[3RD RSTR]
　BEFORE TREATMENT
　　　　OO××O×OO　　　10101010
　AFTER TREATMENT
　　　　O×××O××O　　　01010101

FIG. 15D

[4TH RSTR]
　BEFORE TREATMENT
　　　　OO××O×OO　　　01010101
　AFTER TREATMENT
　　　　×O×××× O×　　　10101010

FIG. 15E

BEFORE TREATMENT　　　　　AFTER TREATMENT
　OO××O×OO　　　　　　　×O××O×O×
　OO××O×O×　　───→　　　OO××O×××
　OO××O×OO　　　　　　　O×××O××O
　OO××O×OO　　　　　　　×O××××O×

FIG. 15F

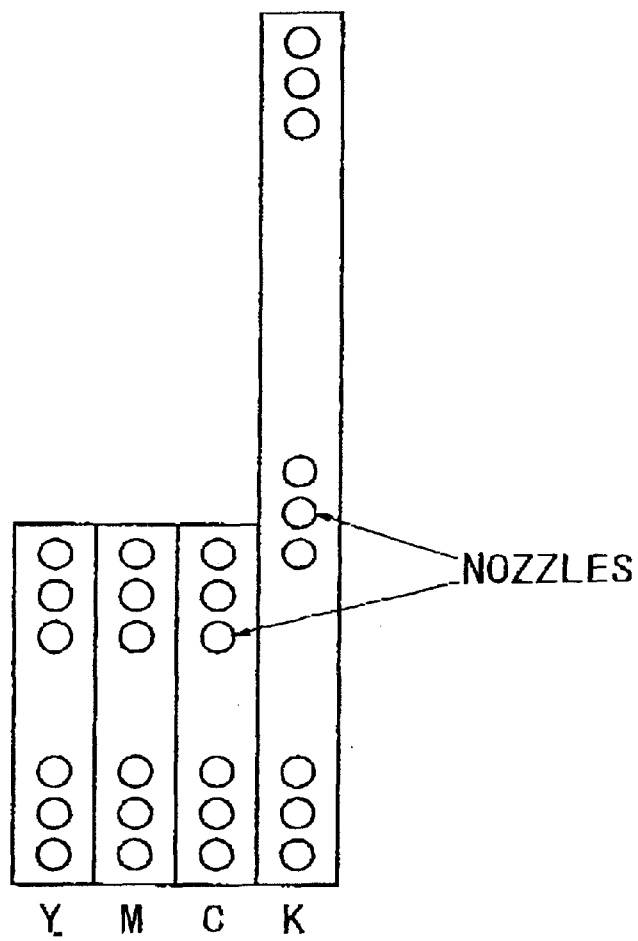
FIG. 18A
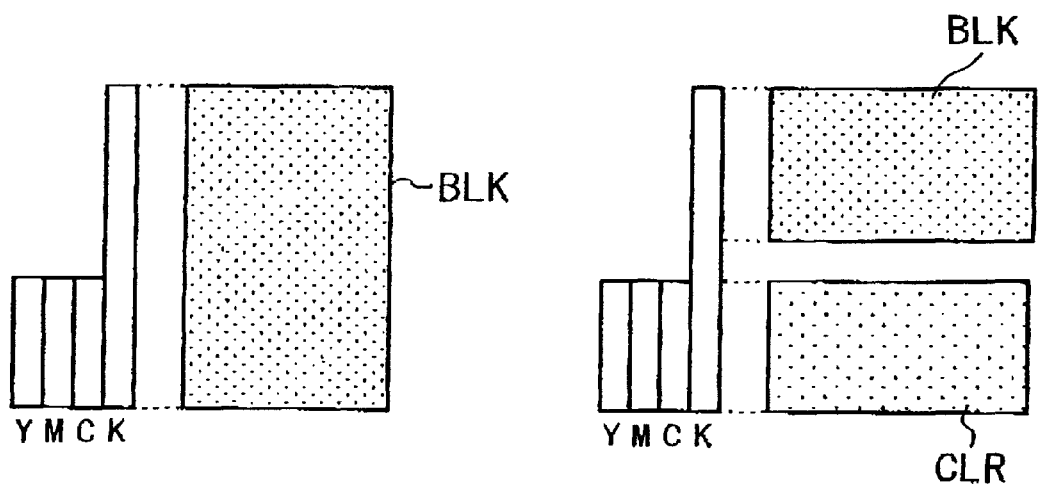
FIG. 18B
FIG. 18C

INK JET RECORDING APPARATUS AND METHOD WITH REDUCED BANDING

FIELD OF THE INVENTION AND RELATED ART

The present invention relates to an ink jet recording method, a recording device and a data processing method in which high quality images can be formed on a recording material with suppressed banding nonuniformly, more particularly to the ink let recording method, the recording device and the data processing method in which the recording is carried out through one-path or multi-path printing.

The present invention is applicable to any equipment using as the recording material, paper, textile, leather, non-woven fabric, OHP sheet, metal or the like. More particularly, the Present invention is applicable to a printer, coping machine, facsimile machine or another office equipment, industrial manufacturing machines or the like.

As regards the recording on the recording material using the recording apparatus, the demand for high-speed printing picks up. In order to increase the printing speed, it is one of the methods to refuse the number of paths in the multi-path printing which has been proposed to accomplish formations of high quality images. Here, the number of paths is the number of scans of the carriage required to complete one line of printing.

Since the number of ejection outlets of the recording head is limited, the amount of the sheet feed for units can is smaller if the number of paths is larger. On the other hand, the sheet feeding distance per unit can can be increased by reducing the number of paths. For example, in the case that printing is carried out in the two-path mode, the speed can simply be doubled by changing it to one-path printing. That is, the reduction of the number of paths reduces the number of scans to cover a predetermined area (one sheet, for example), and increases the distance of sheet feed, so that time required for printing is shortened.

In the case that recording ahead having a plurality of ejection outlets for ejecting the recording liquid (ink) scans the recording material in the direction perpendicular to the direction in which ejection outlets are arranged, an image is formed in an image area in the form of a band by one scan of the recording head, as shown in FIG. 21.

Thus, in the case of the one-path printing, the duty (ratio) of the recording ink ejected per unit time is larger than when the one band area is printed through a plurality of scans (multi-path printing). Therefore, the production of the black stripe between the adjacent bands (paths) is remarkable at the portions where the printing duty is high, although it is different depending on the nature of the recording material and the recording liquid.

The problem is more significant in the case of lateral arrangement of the recording heads in which cyan, magenta and yellow recording heads or the like are arranged in the main scan direction. This is because the boundaries appear at the same position. FIG. 6 schematically shows the laterally arranged recording heads.

The black stripe appearing at the adjacent bands is called connecting stripe, spending or the like. It might deteriorate the image to such an extent that image is practically unsatisfactory.

Therefore, a method of avoiding the banding in one-path printing, thus improving the image quality.

For example, Japanese Laid-open Patent Application 11–188898 discloses a serial scanning type in which a recording head repeatedly scans the recording material in the main scan direction to print the image band by band, and a method is used to avoid the production of a stripe at the connecting portion between the adjacent bands. More particularly, at least one of the first and the last raster lines of one band covered by one scan of the recording head is divided into a plurality of unit areas including predetermined dots. In accordance with the image data, more particularly, with a sum of an amount of ink ejection (duty) for a noting color in each of the divided areas and an amount of ink ejections for the other in the unit areas, the amount of the ink actually ejected is reduced (thinning).

The studies made by the inventors of the present invention have revealed that how conspicuous the boundary stripe is depends upon the printing duty at the band border, and is also significantly affected by the difference in ink depositing time between two adjacent bands. For example, if control is executed to increase the interval in terms of the time between two adjacent bands, in the middle of a printing operation, in order to prevent a recorded image from being smeared as a completed print is discharged, or to prevent a recording head from overheating, the boundary stripe, the position of which corresponds to the increased interval, becomes more conspicuous than the boundary stripes which occur when an image is printed at the normal speed or without an increased interval. Therefore, a process devised to deal with the boundary stripe without consideration of the aforementioned inter-band delay cannot satisfactorily reduce the conspicuousness of a boundary stripe; such a process has much to be improved regarding image quality.

Further, when the distance a carriage must travel to complete the scanning of each raster line is large, there is a significant amount of lag between the two ends of the each raster line. For example, when the speed of a carriage is 8 inches per second, it takes one second for the carriage to scan a single raster line of an image which covers the entirety of an A4 (8 inch) paper. Thus, when an image is bidirectionally printed, this lag becomes two seconds, significantly affecting the conspicuousness of the boundary stripe.

SUMMARY OF THE INVENTION

Accordingly, it is a principal object of the present invention to provide an ink jet recording apparatus, a recording method and a data processing method with which the banding is suppressed even if the interval in time between two adjacent bands is not constant.

Another object of the present invention is to provide an ink jet recording apparatus, a recording method, and a data processing method, which make it possible to provide an image, the banding of which is far less conspicuous than that of an image formed with the use of a combination of a conventional recording apparatus, a conventional recording method, and a conventional data processing method, even if the image is bidirectionally printed.

According to an aspect of the present invention, there is provided an ink jet recording apparatus for effecting recording on a recording material by ejecting ink through a plurality of ejection outlets in units of band with relative scanning movement between a recording head and the recording material, said ink jet recording apparatus, comprising obtaining means for obtaining scanning interval information relating to time period required for recording a connecting portion between a band of a certain scan of the recording bead and a band of the next scan of the recording head; and reducing means for reducing an amount of the ink shot to a neighborhood of the connecting portion on the basis of the scanning interval information obtained by said obtaining means.

According to another aspect of the present invention, there is provided an ink jet recording apparatus for effecting recording on a recording material by ejecting a plurality of ink droplets in units of band with relative scanning movement between a recording head and the recording material, said ink jet recording apparatus, comprising obtaining means for obtaining scanning interval information relating to time period required for recording a connecting portion between a band of a certain scan of the recording head and a band of the next scan of the recording head; and obtaining means for obtaining relative information indicative of a relation of amounts of inks shot in each of unit areas provided by dividing a neighborhood of a connecting portion between adjacent bands scanned by the recording head; determining means for determining, for each of the inks, a reduction rate at which an amount of the ink shot to the neighborhood of the connecting portion in the unit area, on the basis of the relative information for each of the unit areas obtained by said obtaining means and amount information indicative of the amount of each of the inks shot to the unit area; reducing means for reducing the amount of the ink shot to the neighborhood of the connecting portion at the reduction rate determined by said determining means when a scanning interval time period indicated by the scanning interval information obtained by said obtaining means is not less than a predetermined time period.

With the provision of the above described structural arrangement, even when the scanning interval in time between the two adjacent bands is not constant, an image, the boundary stripes of which are substantially less conspicuous than those of an image formed with the use of a conventional means, can be obtained, by thinning the recording data for the adjacencies of the boundary, on the basis of the information regarding the scanning interval in time between two adjacent bands.

Further, the color designation for each unit area (specific area) in terms of color area (combination of hue and chromaticity) is determined on the basis of the number of the recording data (number of ink dots to be placed) for each unit area adjacent to the boundary, and the thinning level for each unit area can be set for each ink and each unit area, on the basis of the thus determined color designation for each unit area. The thinning process is carried out for each ink, on the basis of the thus set thinning level. As a result, the conspicuousness of a boundary stripe which is generated between adjacent two portions of an image, correspondent to two primary scanning movements of a recording head across two adjacent raster lines, when an image is formed by a single-pass printing operation.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 10A and 10B show an example of a thinning rank graph according to the first embodiment of the present invention.

FIG. 11 shows an example of the count in a SMS process according to the first embodiment of the present invention.

FIGS. 12A to 12F show an example of a thinning rank graph according to the first embodiment of the present invention.

FIGS. 14A–14D illustrate a print data processing using the SMS process according to the first embodiment of the present invention.

FIGS. 15A–15F illustrate a print data processing using the SMS process according to the first embodiment of the present invention.

FIGS. 18A–18C are schematic illustrations of a recording head according to a second embodiment of the present invention.

FIGS. 25A and 24B are schematic illustrations of behavior of the recording ink on the recording material

DESCRIPTION OF THE PREFERRED EMBODIMENTS

Figure 1:
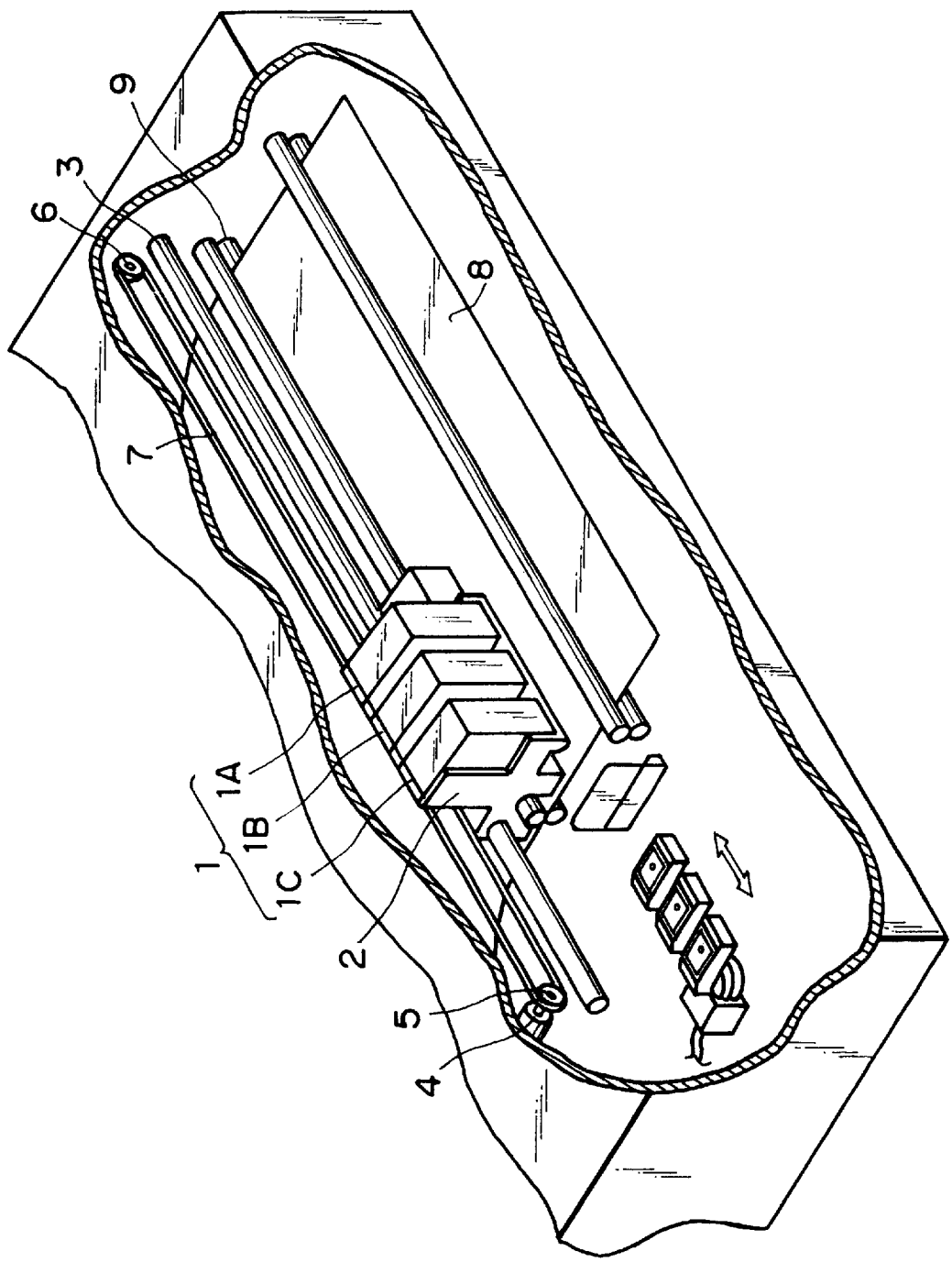
FIG. 1 is a partly broken perspective view of an ink jet recording apparatus according to an embodiment of the present invention.

The preferred embodiments of the present invention will be described taking a serial printer having a plurality of recording heads for instance.

In this embodiment of the present invention, a neighborhood of a connecting or boundary portion of the data of one band is divided into a plurality of unit areas, and the number of dots for each of the unit areas are counted, and then, the color area of a noted area is discriminated on the basis of the number of dots for the respective colors. A thinning rank for each thinning process area is determined for each color on the basis of a predetermined thinning rank graph and the number of the dots (or printing duty) for each unit area (in particular, bottom edge portion of preceding band) provided by a sum of the dot count for each color in the color area. The SMS thinning process is carried out on the basis of the thus determined thinning rank. Hereinafter, this connecting process will be referred to as normal connecting process.

In this embodiment, an additional connecting process is carried out, on the basis of information regarding the scanning interval in time between the two adjacent bands, in the same manner as the normal connecting process is carried out. According to this additional connecting process, a thinning rank is set for each ink ejected in each unit area in the adjacencies (in particular, top edge portion of following band) of the boundary, and the SMS thinning process is carried out on the basis of the thus set thinning ranking. Hereinafter, this additional thinning process is referred to as delay compensation thinning process.

Scan Interval Information

A terminology scan interval information here means information regarding the time between the scanning run of a recording head across a given recording band and the scanning run of the recording head across the immediately adjacent recording band. This scan interval information includes the information regarding a delay, or an increase in scan interval, provided for improving image fixation to prevent an image from being smeared when a completed print is discharged, and/or preventing a recording head from overheating, the information regarding the data transfer time, the length of which depends upon the amount of print data, and the information regarding the data processing time for creating print data. It also includes the information regarding an ink ejecting position and scan direction, since the scanning speed of a carriage must be taken into consideration to set the scanning interval. Further, it may include the length of the print data per scan.

In other words, according to the present invention, the scan interval information does not need to be such information that directly concerns the time required to print a portion of an image correspondent to the boundary between adjacent two scanning bands; it may be indirect information, as long as it relates to the scan interval between two adjacent scanning bands.

Position of Thinning Process

Figure 5A:
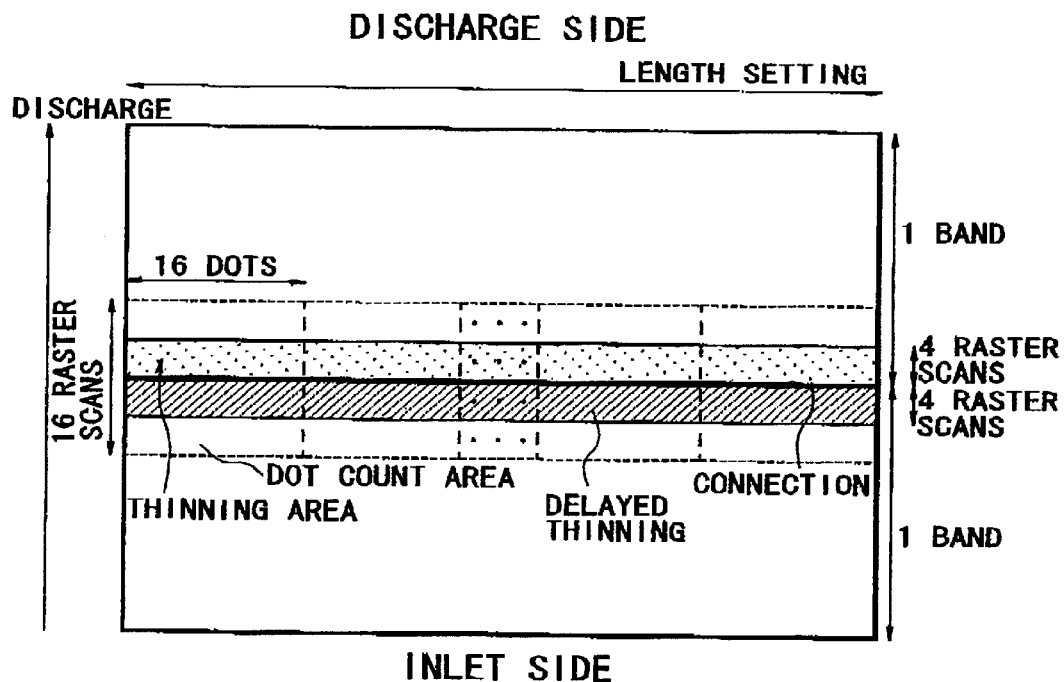
FIGS. 5A and 5B illustrate an area for which a dot counting operation of the print data is carried out and an area in which the thinning is executed.

As shown in FIGS. 5A, B, the area in which the thinning process is executed is normally several raster areas (4 rasters, for example) at a sheet inlet side (upstream side with respect to the feeding direction of the sheet) in one scan area to be printed. It is noted that thinning beforehand, that is, the thinning in the sheet feeding side is preferable than the other, since the margin relative to the recording material is large. By doing so, a larger number of recording materials can be supported than in the case that thinning processes effected at the sheet discharging side on the basis of one parameter.

As for the area of each scanning band, for which the delay compensation thinning process is carried out, the portion, equivalent to several raster lines (for example, four raster lines), on the side from which a recording medium is discharged, is targeted This is for the following reason. That is, generally, the delay is set immediately before a recording head begins to scan a given band. Therefore, when the thinning process is carried out for the following scanning run, the boundary portion is on the discharge side.

When the thinning process is effected over several raster areas, the degrees (rank graph, in this example) of thinning can be independently selected for each raster areas or for each several raster areas, by which, for example, the degree of thinning can be made higher in the area closer to the boundary than in the other areas, thus improving the accuracy of the thinning process Dot Count Area The area in which the dots are counted, as shown in FIG. 5A, is 16 dots×16 rasters areas (dot) astride the boundary area, whether the normal thinning process is carried out or the delay compensation thinning process is carried out. Since the area in which the dots are counted is larger than the thinning area so that print data of the bands astride the boundary are counted, the circumstances influential to the bleeding at the boundary can be taken into consideration.

Incidentally, whether the normal thinning process is carried out or the delay compensation thinning process is carried out, the dots in the same area are counted. However, when the normal thinning process is carried out across the boundary area of the preceding band of two adjacent bands, the dot counting is repeated. Further, when the delay is short, a boundary stripe is not affected by the delay, and therefore, the delay compensation thinning process does not need to be carried out, eliminating the need for the recounting of the dots, which is obvious.

Thinning Processing Method

The thinning process for the print data in this embodiment is a so-called SMS (sequential multi-scan) type. Other thinning processing methods include a type using a pattern mask and an error diffusion (ED) type.

Figure 24A:
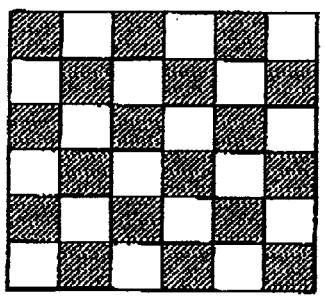
FIGS. 24A–24E illustrate a thinning process using a mask according to an embodiment of the present invention.
Figure 24B:
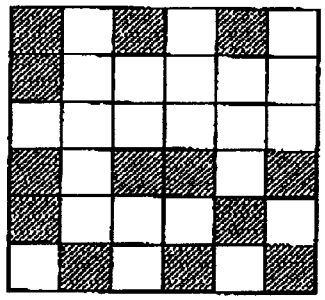
Figure 24C:
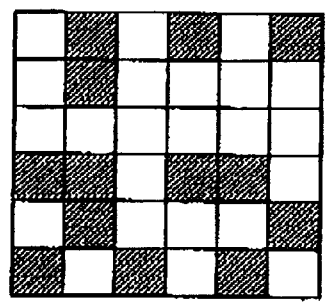
Figure 24D:
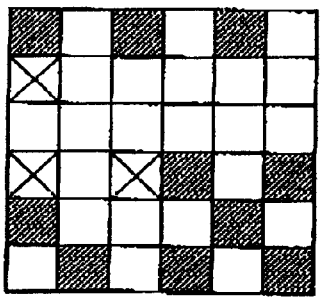
Figure 24E:
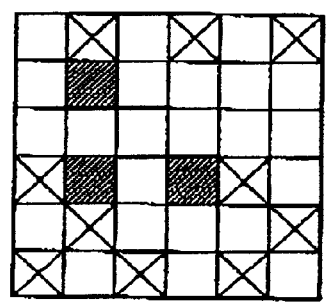

However, in the method using the pattern mask (FIGS. 24A–E), a mask of staggered arrangement is used for example (pixel data of white parts are skipped), and when the print data having the same amounts of ink ejections as shown in FIGS. 24B–C are processed, the data after the process are shown in FIGS. 24D and 24E, and the print data at the "x" portions are skipped. As will be understood from the two Figures, the thinning mask and the print data interfere in the case of the data of the same ejection amount (duty), depending on the arrangement of the print data, and therefore, the amount of thinning cannot be controlled in some cases.

As to the use of the error diffusion type, the following is an example.

If the pixel for which the quantitized image data process is to be effected, contains the data to be printed, a multi-level value is assigned in accordance with a predetermined nozzle correction value:

Errors of the peripheral pixels are added;

After comparison with a predetermined threshold, it is determined whether or not the print data is skipped or not;

The error resulting from the determination is calculated.

The error is assigned to a peripheral pixel or pixels: and

If the pixel for which the quantitized image data process is to be effected, does not contain, the errors in the peripheral areas are obtained and then are reassigned to the peripheral areas.

The pixel to which the error is allotted in at least one of the pixels in the scanning direction of the boundary processing or the pixels to be process next.

Although this type of thinning process makes it possible to properly thin print data, it is predicted that in the case of single-pass printing, the print data process requires too long a time, since the recent high density nozzle head has may nozzles. If the printing operation is interrupted waiting for the data process, the carriage has to stop with the result of low throughput which is against the purpose of use of single-pass print.

In view of this, in this embodiment, the use is made with a so-called SMS thinning process to accomplish both of the uniformation of the amount of thinning and the high speed processing. In the SMS thinning process, whenever there is a printing datum, the number designated by the counter (register) (particular bit; MSB, for example), and if it is "1", the print data is not skipped (printed), and on the other hand, if the counter value is "0", the print data is skipped (thinned) (not printed). The counter is shifted to the right (bit shift). When the Counter is shifted to the right side end, it returns to the left end (cyclic shifting).

Thinning Table

Figure 25A:
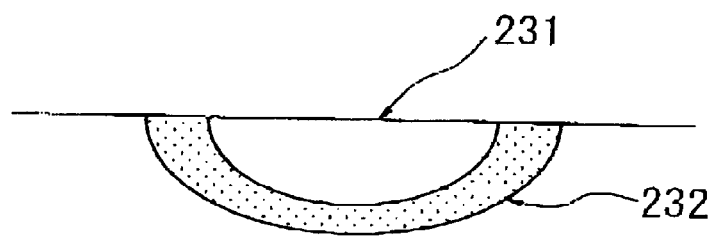
Figure 25B:
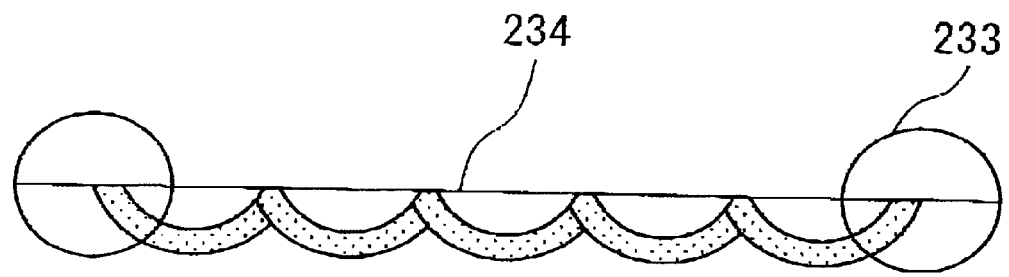

The coloring at a marginal area of printed dot is different if the order of prints of inks on the recording material is different. FIGS. 25A and 25B schematically show an example of penetration of the recording ink into the recording material. The behavior of penetration of the recording ink is different depending on the material of the recording ink, the recording material, the ambient conditions, differences in the time interval between prints or the like, however.

Here, the later printed recording ink 232 sinks under the first printed recording ink 231. In this manner, the recording inks printed onto the same position on the recording material do not mix with each other, usually, and the coloring occurs with the situation shown in FIG. 25A. It will be understood that at the end 233 of the printing indicated by a circle in FIG. 25B, has a coloring which is different from that inside 234. More particularly, the later printed ink 232 has a stronger coloring than the first printed ink 231. This functions also to worsen the connecting seam at the boundary. Therefore, even if the same thinning rate is used for the recording ink to be first printed and the recording ink to be later printed, the differences in the coloring at the marginal area are not avoided. Therefore, in this embodiment, the thinning rate is determined in consideration of the order of depositions of the ink onto the recording material.

FIG. 10A shows an example of a rank graph for a thinning to be used for determining the thinning rate in this embodiment. The thinning rank graph gives ranks corresponding to the number of the dots in the dot count area for each of the inks which is subjected to the thinning process.

The thinning rank graph is designated on the basis of three values, namely, a start dot number, the dot interval and the MAX rank. The levels of the thinning ranks are determined beforehand. In this embodiment, for example, there are nine levels, namely, 0%, 12.5%, 25%, 37.5%, 50%, 62.5%, 75%, 87.5% and 100%.

The respective parameters will be described. The start dot number is the total dot number at which the use of the thinning rate 12.5% (thinning rank 1) is started. The dot interval is the number os dots before the next thinning rate (25% if the current thinning rate is 12.5%), that is, the range of the dot count using the same thinning rate. MAX ran is the maximum thinning rate, that is, no thinning rate beyond that is not selectable. If the thinning rate reaches the MAX rank, the thinning rate is not raised, and the MAX rank thinning rate is maintained even if the number of dots reaches the number corresponding to the dot interval.

Because of this system using the three parameters, one thinning line in the rank graph can be expressed by 1 bite ((8 bits); one component (8 levels) for the start dot number, one component for the duct interval (8 levels), and one component (4 levels) for the MAX rank 1.

In order to enhance the resolving power for each of the parameter, the number of bits may be increased. Alternatively, the number of bits is not changed, but a common offset value may be given commonly to the start dot number, the dot interval and the MAX rank, by which the parameters can be more accurately set.

In this manner, the amount of the data required for setting the thinning rank graph. The reduction of the amount of the data is particularly preferable in this embodiment. The reason is as follows. In order to carry out the connecting processing as in this embodiment in the quick printing mode as in the one-path printing mode, use of hardware prefers to the use of software This is because the speed of the data processing using the software is not enough to catch up with the printing speed. It is preferable to use hardware such as a gate array. In this case, the number of required data is directly influential to the number of gates, and therefore, less number of data is preferable from the standpoint of the circuit scale.

FIG. 10B shows another example of the thinning rank. This example is particularly effective in such a case that inclination of the thinning rank line is desirably changed.

In addition to the three parameters required to express the thinning ranks, there are provided the change dot number indicative of the start point of the inclination change and the dot interval 2 for determining the new inclination, in this example. With use of such parameters, more accurate control is accomplished.

Color Area Discrimination

Depending on the relationship between the used ink and the recording material, the behavior on the recording material after the actual printing is different, and the conspicuousness of the boundary line and the effectiveness to the boundary line after the thinning process is also different.

For example, in the case of a gradation from white to blue and UC (under color, mixture of YMC), the printing is carried out using the cyan ink and the magenta ink where the color is changing toward blue, and at the position where the blue reaches the maximum level, the solid printing occurs for the cyan and magenta colors (the data of maximum duty). In the state, in order to reduce or suppress the boundary line, a certain high degree of thinning process is effected to the cyan and magenta colors.

Suppose that gradation from white to red and UC using the same thinning parameters. Then, the cyan ink is first started to be used at the point of change from the red at the maximum to the UC. At this point, the data for the magenta have the maximum duty level which is the same as the position where the gradation changes from the blue to the black in the foregoing white-blue-black gradation example, and therefore, the highly thinning rate used for the cyan and magenta colors in the foregoing example, is used in this example. These results in that large percentage of cyan dots are removed in the area where the cyan dots are sparse, and therefore, lack of cyan dots is conspicuous.

Thus, it is desirable in the connecting process in the boundary area in the formation of color images that in addition to the conventionally used total amount of the ink to be applied to the unit area adjacent to the end portion, the information relating to the hue and the chromaticity of the unit area and the information as to which recording ink is used for printing is obtained, and that thinning rate is selectable on the basis of these pieces of information. In order to accomplish this, in this embodiment, the discrimination is made as to the hue and the chromaticity of the noting area (unit area) from the number of dots for each color. In the following, the term color area is used as a word covering both of the hue and the chromaticity in combination.

In the foregoing embodiment, the color area of the noting area is discriminated from the number of recording data (the number of dots to be printed) in the neighborhood of the boundary area between adjacent bands, and in accordance with the color area, the thinning rank (the degree of thinning) can be selected for each of the used ink and the recording positions. Using the selected thinning rank, the thinning process is effected to each of the inks, so that conspicuousness of the boundary line between adjacent bands can be suppressed in the one-path printing.

The description will be made as to Details of this embodiment. The same reference numerals are assigned to the elements having the corresponding functions in the Figures.

First Embodiment

The first embodiment relates to a recording system in which the plurality of recording heads are used to effect recording on the recording material with recording ink. First, the normal connecting process will be described, and then, the delay compensation connecting process, which is one of the characteristic aspects of the present invention, will be described.

Example of Recording Device Structure

FIG. 1 is a schematic perspective view of a major part of an ink jet recording apparatus according to the first embodiment of the present invention. In FIG. 1, a plurality of (3, in this embodiment) head cartridges 1A, 1B, 1C are replaceably mounted on the carriage 2. Each of the cartridges 1A–1C is provided with connector for receiving a signal for driving the recording head. In the following descriptions, when all the recording means 1A–1C or anyone on them are designated, the term "recording means" (recording head or head cartridge) is used.

The respective cartridges 1 function to print different color inks, therefore, the ink containers contain cyan, magenta, yellow inks and so on which have different colors. Each of the recording means 1 is exchangeably positioned and carried on the carriage 2 the carriage 2 is provided with a connector holder (electrical connecting portion) for transmission the driving signal or the like to each of the recording means 1 through the connector.

The carriage 2 is supported and guided on a guiding shaft 3 extending in the main scan direction in the main assembly of the apparatus, and is movable in the main scanning direction. The carriage 2 is driven and controlled by the main-scanning motor 4 through a motor pulley 5, a driven pulley 6 and a timing belt 7. The recording material 8 such as a sheet of paper, thin plastic resin sheet or the like is fed through a recording position where the recording material is faced to the ejection outlet side surface of the recording head 1 by the rotation of the two pairs of feeding rollers. The recording material 8 is supported on a platen (unshown) at the back side so as to provide a flat recording surface in the recording position. In this case, each of the cartridges 1 carried on the carriage 2 has the ejection outlet side surface which is projected downwardly from the carriage 2, and is supported to be parallel with the recording material 8 between the pairs of feeding rollers.

Figure 6:
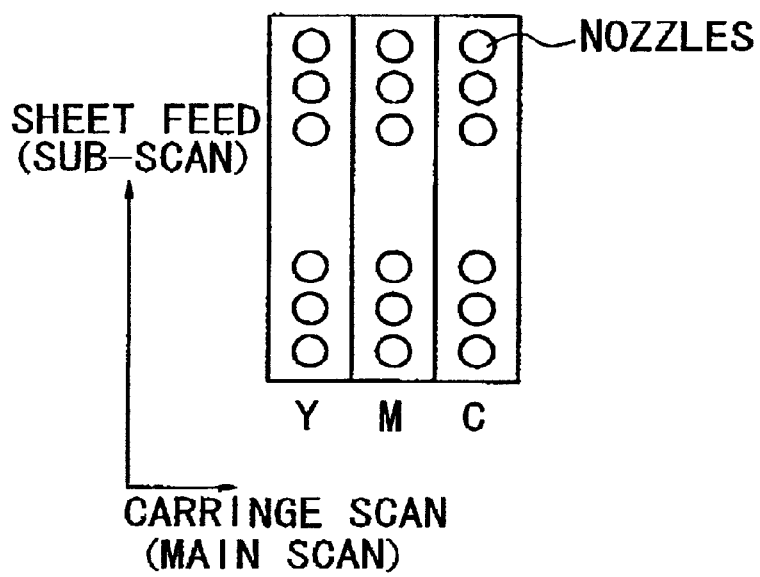
FIG. 6 is a schematic view illustrating a structure of the recording head according to the first embodiment of the present invention.

The recording head 1 is in the form of an ink jet recording means which ejects the ink using the thermal energy, and is provided with electrothermal transducers for generating thermal energy. In the recording head 1, film boiling is caused by the thermal energy applied by the electrothermal transducer. By the growth and collapse of the bubble created by the film boiling, a pressured change is produced so as to eject the ink. FIG. 6 illustrates a structure of nozzles of the recording heads.

Figure 2:
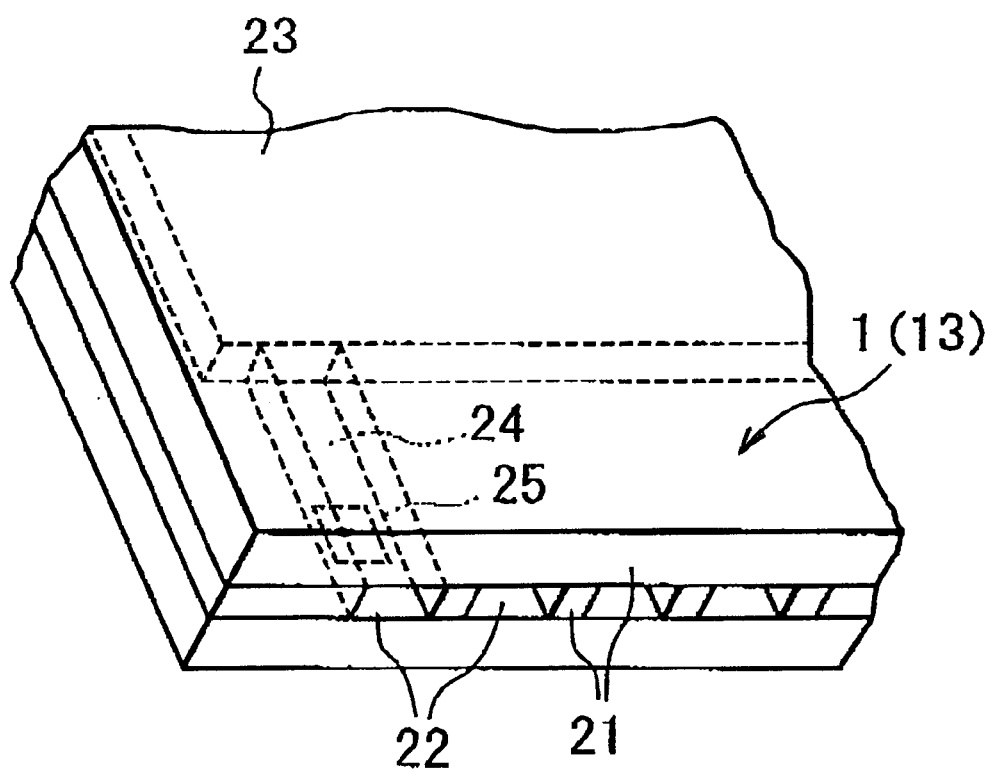
FIG. 2 is a schematic perspective view of a major part of a recording head used in the apparatus of FIG. 1.

FIG. 2 is a schematic perspective view illustrating a major part of an ink ejection portion 13 of the recording head 1. As shown in FIG. 2, the ejection side surface 21 is faced to the recording material 8 with a gap of approx. 0.5–2 mm, and is provided with a plurality of (256 in this embodiment) ejection outlets 22 at a predetermined intervals (360 dpi in this embodiment). She recording head further includes a common liquid chamber 23 and flow paths 24 for fluid communication between the common liquid chamber 23 and the ejection outlets 22. Each of the flow paths 24 is provided of the wall constituting the path with an electrothermal transducer 25 (heat generating resistor, for example) which is effected to generate energy corresponding to the amount of the ink ejection. In this embodiment, the recording heads 1 are carried on the carriage 2 in the manner that said ejection outlets 22 are arranged in the direction crossing with the scanning direction of the carriage 2. The electrothermal transducers 25 corresponding to the image signals or to the ejection signals are actuated (energized) to cause a film boiling in the ink in the flow path 24, and the pressure produced by the boiling functions to eject the ink through the ejection outlet 22.

Figure 3:
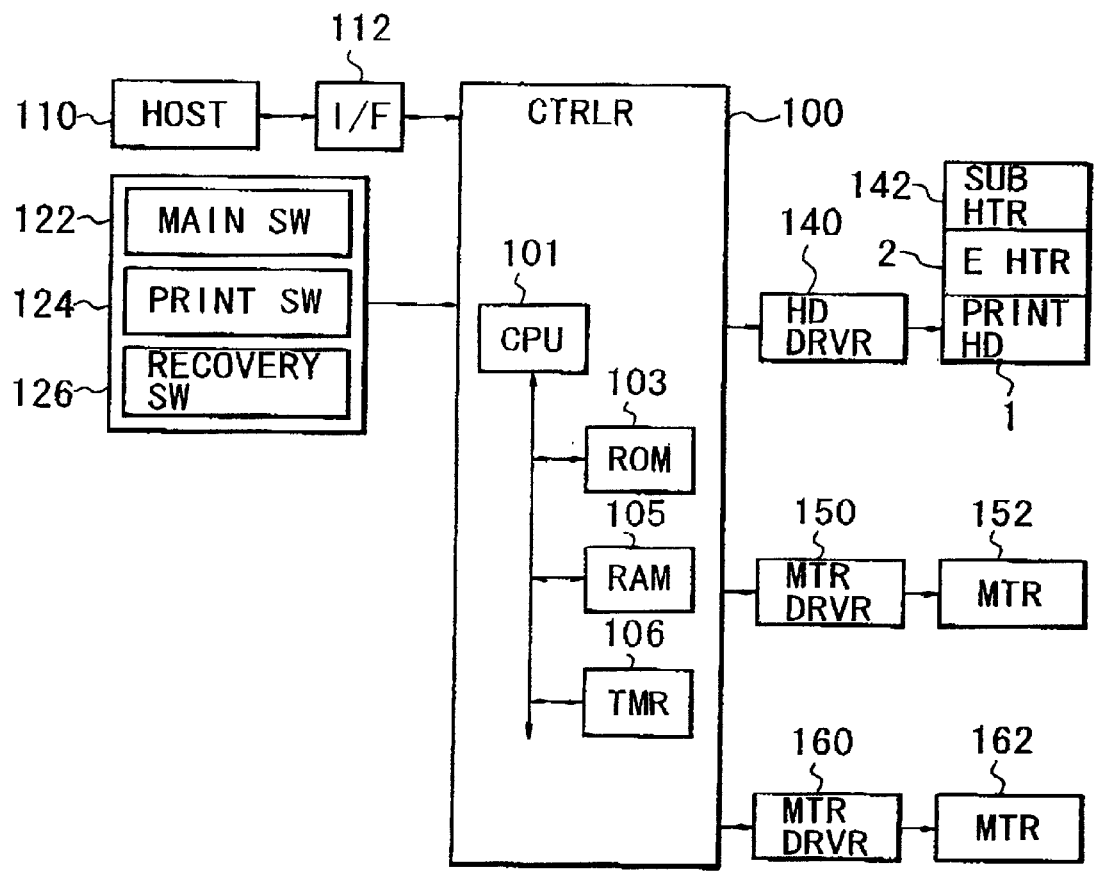
FIG. 3 is a block diagram of a control circuit for an ink jet printing apparatus according to an embodiment of the present invention.

FIG. 3 schematically illustrates a control circuit used in the ink jet printing apparatus shown in FIG. 1.

In FIG. 3, a controller 100 constitutes a main controller and includes a CPU 101 in the form of a microcomputer, a ROM 103 storing a program, a table, fixed data or the like, and a RAM 105 providing an area for conversion of the image data and a working area. The host apparatus 110 is the supply source of the image data, and it may be a computer which produces and processes image data or the like relating to the printing, or it may be a reader portion for reading images. The image data, the command, the status signal and the like are supplied to or received from the controller 100 through an interface (I/F). Further, it includes a timer 106 for counting the delay as the scan interval information, and measures the length of the delay for preventing the aforementioned smear which occurs when a completed print is discharged, and the length of the delay for cooling the recording head as the recording head begins to overheat.

The host apparatus 110 is the supply source of the image data, and it may be a computer which produces and processes image data or the like relating to the printing, or it may be a reader portion for reading images. The image data, the command, the status signal and the like are supplied to or receive from the controller 100 through an interface (I/F) 112.

An operating portion 120 include a group of switches operable by the operator, a main switch 122, a print start switch 124, a recovery switch 126 for actuating suction recovery operation.

A head driver 140 actuates the ejection heaters 25 of the print head 1 in accordance with the print data or the like. The head driver 140 includes a shift register for aligning the print data corresponding to the positions of the ejection heater 25, a latching circuit for effecting latching at proper timing, a logic circuit element for actuating the ejection heater in synchronism with the drive timing signal, a timing setting portion for properly setting the actuation timing for correct positioning of the dot formation.

The print head 1 is provided with a sub-heater 142. The sub-heater-142 functions to control the temperature in order to stabilize the ejection property of the ink, it may be formed on the print head substrate simultaneously with the ejection heater 25, or it may be mounted to the main assembly of the print head or the head cartridge.

The motor driver 150 is to drive the main-scanning motor 152, and the sub-scan motor 162 is for feeding the print medium 8 (sub-scan), the motor driver 160 is a driver for the motor.

Print Data Process

Figure 4:
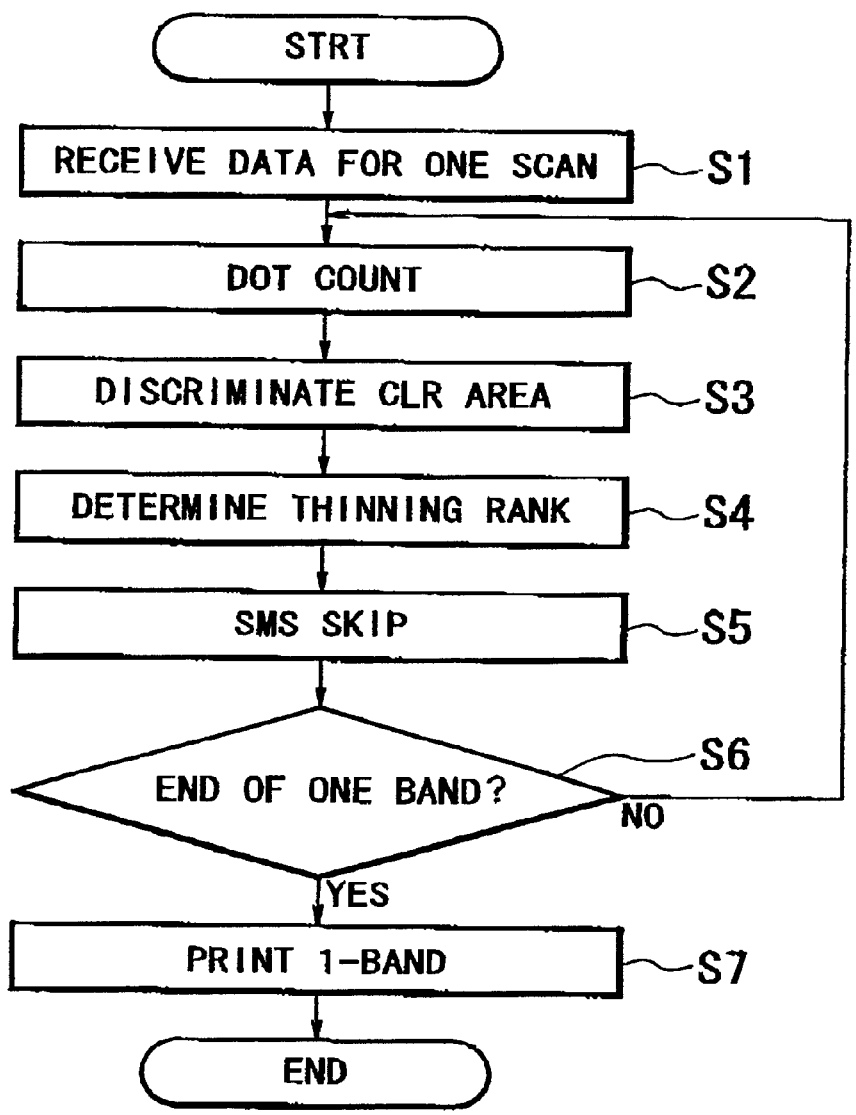
FIG. 4 is a flow chart of process steps according to a first embodiment of the present invention.

FIG. 4 is a flow chart showing operations, in the normal thinning process, from the reception of the amount of the print data corresponding to one scan to the end of the print data process At step S1, the amount of the print data required for printing one scan for each of the different color inks. For the printing of one scan, the data for one band is necessary, and the data in the dot count area of the next band are required as well. Here, one band is a printing area printed by one carriage scanning operation.

Figure 5B:
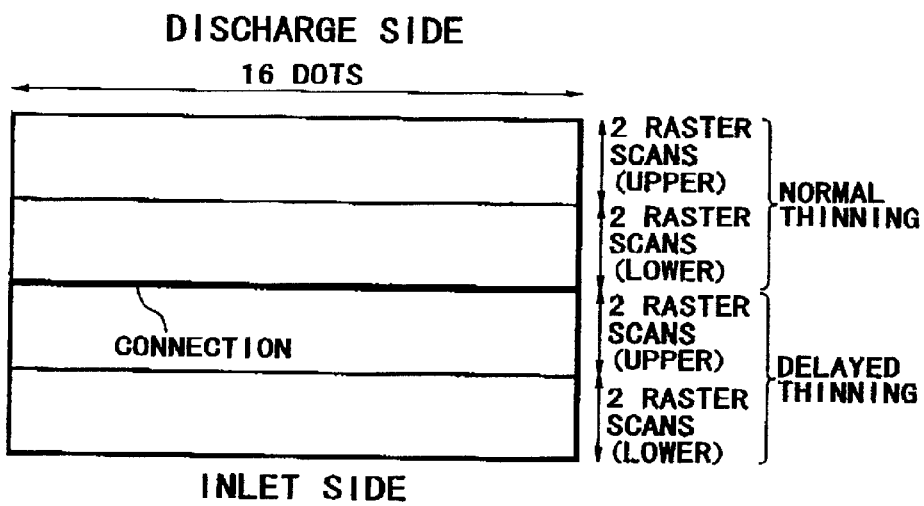

After the print data is received, a step S2 executes the dot count operation, a step S3 executes the color area discrimination, a step S4 executes the thinning rank determining operation, and a step S5 effects the SMS thinning process, for each of the unit areas, that is, each of 16 dots×16 dots raster areas shown in FIG. 5. At step S6, the foregoing process is repeated until one band is covered. After the processing of the print data for one band, an image portion equivalent to the band is printed in step S7 The description will be made as to the respective processes.

Dot Count

In this embodiment, the area subjected to the dot count operation is a width corresponding to the 16 raster lines including the connecting portions between adjacent bands.

The dot count operation is carried out for all of the recording inks carried on the recording device of this embodiment, more particularly, the dot count operation is carried out for the binary data for the cyan, magenta and yellow colors. A sum of the dot counts of them is the dot count (or the total dot count) as a result of the dot count operation.

Here, the event that the number of dots is "1" means that one dot is present in one pixel, and the event that the number of dots is "2" means that two dots are present in one pixel.

The dot count operation is carried out in the divided areas adjacent to the boundary between adjacent bands, and the size of the area is 16 raster lines in the sheet discharging direction, and 16 dots in the scanning direction of the carriage (unit area for the dot count). Therefore, the maximum of the total dot count value is 16 (raster)×16 (dots)×3 (color number)=768.

In the process of this embodiment, and the thinning rank is determined from the total dot count obtained by the dot count step, and the SMS thinning process is carried out. It is possible to obtain relative information indicative of the relative relation among the amounts of the inks printed in the unit areas, from the dot counts for each of the colors, and the discrimination is made as to the color area (hue and chromaticity) of the unit area from the relative information.

Such a process is repeated for one band until all of the bands corresponding to one page are subjected to the process, so that print data are generated.

Therefore, in the case of 360 dpi A4 full scanning (8 in.), 180 calculations (360 (dpi)×8 (inch)/16 =180) are to be carried out.

In this embodiment, the total number of dots is the simple total sum of the dot counts of the cyan, magenta and yellow colors, but the counts may be weighted depending on the colors when the degrees of influence to the production of the boundary strike are not uniform. For example, in a case, the conspicuousness of the boundary line is worsened by the yellow ink, then, the number of dots for the yellow color may be weighted, for example, the number of dots of the yellow is multiplied by 1.2. In another case, the ejection amounts are different depending on colors (for example, in the amount of the ejected red ink is larger than the other, then, this is taken into account.

Using the dot count process as described in the foregoing, the data processing may be carried out only for the small areas which is adjacent to the boundary between bands (that is, the end portion of the array of the nozzles. Therefore, the load required by the process is small, such that even in the case that time period which can be given to the process is short as in the case of one path printing.

The description will be made as to the reason why the 16 dots×16 dots area astride the boundary between the adjacent bands is selected as the unit area in which the dot count operation is carried out In this case, the maximum value of the total dot counts is 16×16×3 (the number of colors)=768 In order to form 1 band, 180 calculations are required in the case of 360 dpi, as described hereinbefore, and in the case of 600 dpi, A4 full scanning (approx. 5in.), the number of calculations is 600 (dpi)×8 (inch)/16=300. More specifically, as shown in FIG. 5A, the dot count operation is sequentially carried out for each of the dot count unit areas for all of the range determined by the set length, and the corporations are carried out for all of the dot count unit areas, by which the dot count operation for 1 band is completed.

By using the areas astride the boundary between the adjacent bands in this manner, the state of print dots before and after the boundary can be known. More particularly, it is possible to discriminate whether or not the ink ejections tend to produce the boundary line, and therefore, a high precision boundary processing is accomplished. When the dot count operation is carried out only for the areas within one band, it is possible to predict the degree of ink bleeding attributable for the production of stripes within the band, but it is not Possible to predict the degree of influence to the next band. The production of the boundary line or stripe is dependent on the amount of the ink adjacent the boundary between the adjacent bands.

For example, when a certain quantity of ink is in the next band, the boundaries stripe is suppressed due to the ink bleeding. When the amount of the ink is small, the Possibility of the production of the stripe is not high, although the ink bleeding may occur.

Figure 13A:
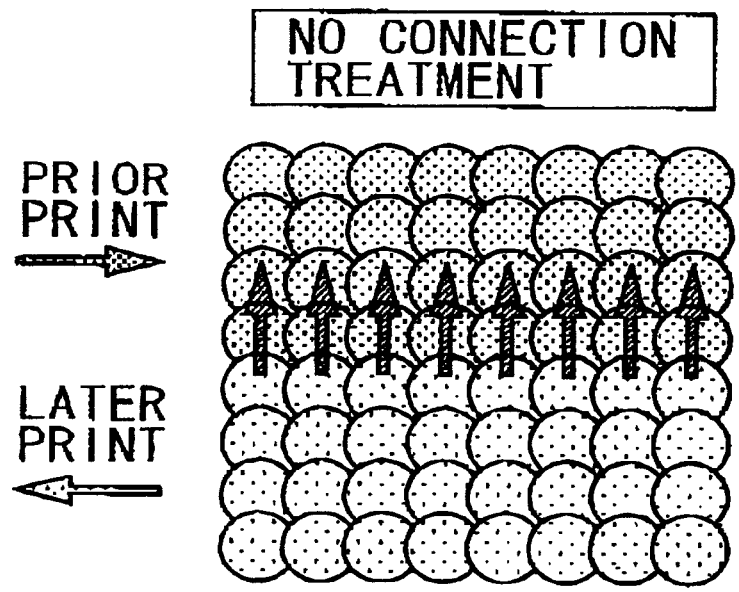
FIGS. 13A and 13B illustrate a mechanism of ink bleeding occurring at the connection between adjacent bands.

Referring to FIGS. 13A, B, the description will be made as to the mechanism of the stripe production.

To the place where the shot ink is being fixed with some bleeding, the next band ink is shot. Then, in the process of the next ink penetrating into the material of the sheet or on the surface thereof, the next ink is considered as being attracted to the ink of the previous shot. At this time, if no processing is given to the boundary area, the amount of the ink at the boundary becomes larger, is shown in FIG. 13A with the result of a darker boundary. This is considered as the cause of the production of the stripe.

Figure 13B:
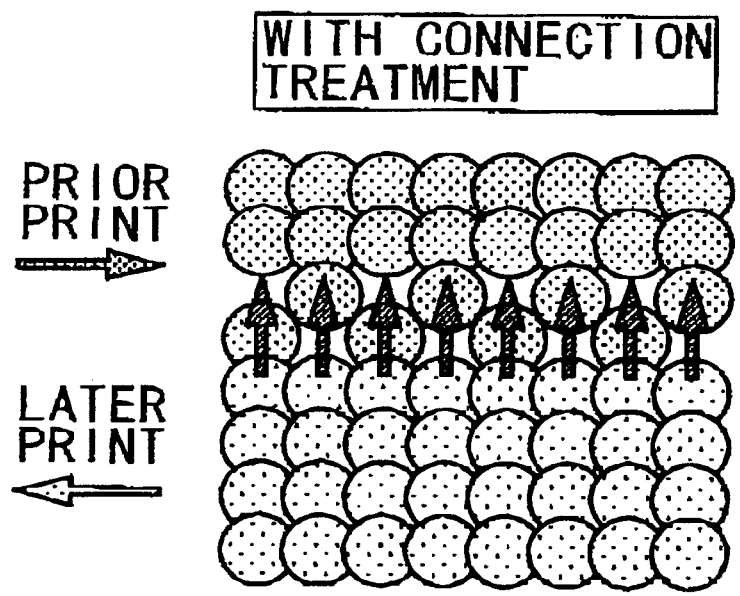

In order to avoid this, the boundary processing is carried out as shown in FIG. 13B to reduce the amount of the ink either in the first or second band, that is, the print data are thinned. The thinning process may be carried out in one of the first and second bands or in both of them.

As described in the foregoing, the production of boundary stripe is attributable to the amounts of the ink in the adjacent bands. Therefore, the selection of the areas to be processed extend astride the boundary is effective for the processing.

At the time of the dot count operation, the data for the first band or the second band may be weighted. For example, when the cause of the stripe production is the amount of the ink, the number of dots of the first shot band may be multiplied by 1.2, so that amount of the ink in the first band may be sensitively taken into account.

Color Area Discrimination

Figure 7:
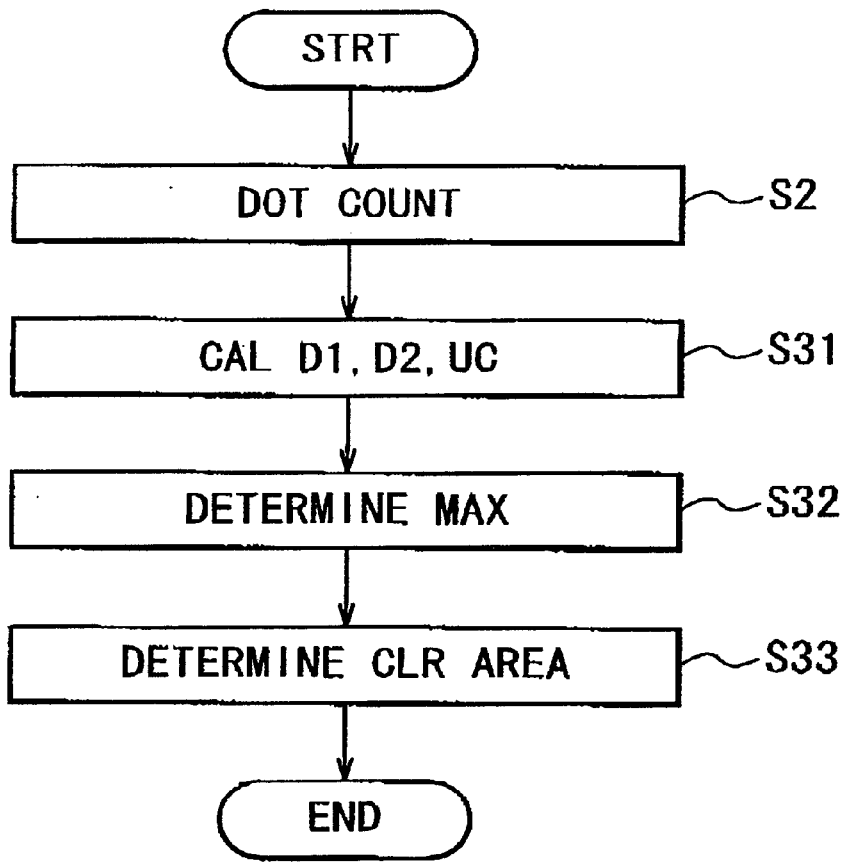
FIG. 7 is a flow chart of color area discrimination steps according to the first embodiment of the present invention.

FIG. 7 is a flow chart for the color area selection.

Figure 8:
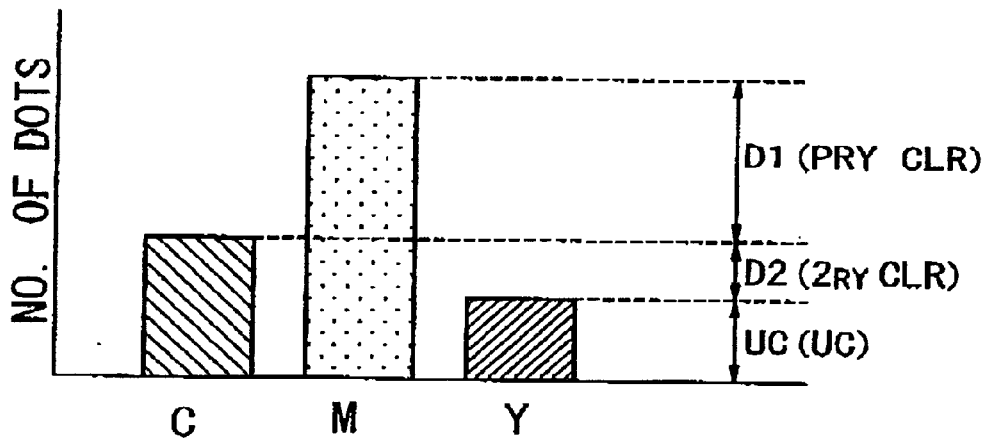
FIG. 8 is a schematic illustration of an example of the number of dots in a unit area according to the first embodiment of the present invention.
Figure 9:
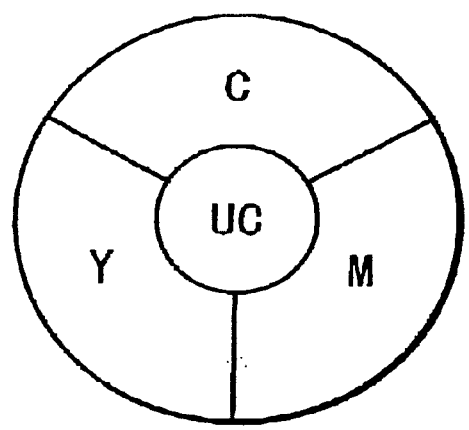
FIG. 9 shows an example of the sections of the color areas according to the first embodiment of the present invention.

At step S2, the dot count operations are carried out for the respective colors, FIG. 8 shows an example of number of dots in a unit area, and FIG. 9 shows sections of color areas used in this embodiment.

In example of FIG. 8, the order of the number of dots is the magenta, the cyan and the yellow (smallest). The portion of yellow with which the number of dots is the minimum among the three colors is called "UC" (under color), the portion resulting from the cyan (second largest) deducted by the UC is the secondary color (D2, blue in this embodiment) portion. The portion of the magenta (the largest) detected by the second largest cyan is the primary color (D1, magenta in this embodiment). The D1, D2, UC are calculated in a step S31.

The largest among the D1, D2, UC is discriminated, by which the position of the noting dot count area (unit area) in FIG. 9 is determined (step S32). In this example, D1 is the largest, and therefore, it is discriminated that dot count area is in the magenta.

If there are two or three largest number portions in the D1, D2, UC, the color area is selected in the order of UC, D2, D1 (if UC and D@ are the same, UC, is selected; if K! And D@ are the same, D2 is selected, and therefore, D1 is not used actually) (step S33). (Thinning rand graph)

FIG. 10A shows an example of a rank graph for determining the thinning rank.

Here, FIG. 10A is plots of the total number of dots (ordinates) vs. the thinning rank corresponding to the thinning rate (abscissas). Using the graph, the thinning rate for the data (count in the SMS processing) is designated on the basis of the total number of dots for the unit area, obtained by the dot count process.

In these embodiments, the thinning rates are one of 0%, 12.5%, 25%, 37.5%, 50%, 62.5%, 75%, 87.5%, 100% (nine levels). The counter value is shown in FIG. 11.

As described in the foregoing, the designation of the thinning rank graph is determined on the basis of the number of the start dot, the dot clearance and the MAX rank.

FIG. 10A also shows the correspondence of the three parameters and the thinning rank graph.

In this embodiment, as described in the foregoing, in the three parameters are the start dot number, the thinning clearance and the MAX rank, in accordance with which the thinning rank graph is selected. However, this way of selection is not limiting in the present invention. In view of the fact that with the foregoing method of determination of the thinning rank graph, the relation between the total dot count number and the thinning rate cannot be other than linear, another method is such that thinning rank graph per se is speculated.

The number of levels of the thinning rates is not necessarily limited to nine, but may be increased as desired.

FIG. 12 shows an example of the thinning rank graph used for the normal thinning process in this embodiment. As described in the foregoing, the thinning rank graph is determined properly for each color, and FIGS. 12A–F show an example for one color area magenta.

In this embodiment, the thinning rank is designated for each of different inks (cyan, magenta and yellow). The thinning area is divided into two portions in the sheet discharge direction (sub-scan direction), and the thinning rank graphs are selected independently from each other. Therefore, in FIGS. 12A–F, six thinning rank graphs are used (cyan upper, cyan lower, magenta upper, magenta lower, yellow upper and yellow lower).

In addition, FIGS. 12A–F show only the graphs for the color areas (magenta in this example) discriminated as a result of a color area discriminating operation. Actually, however, such a combination is present in each of the cyan, the yellow and the UC.

By setting the thinning rank graph for each of different inks, the control can be responsive to the difference in the degree of the boundary stripe due to the difference in the behavior on the recording material depending on the inks, the difference in the conspicuousness due to the difference in the lightness and/or the chromaticity depending on the inks.

Additionally, the thinning rank graph can be set for each color, and the process can be responsive to the change in the color at the end portion resulting from the order of shots onto the recording material. The change in the color at the end portion is like this. As described referring to FIGS. 25A and 25B, the behavior of the ink is dependent on the time difference of the ink elections onto the recording material and on the property of the recording material, but in the case that time difference of the ejection is very short because of the lateral arrangement of the recording heads, an outline bordering of magenta color is produced when the cyan and magenta inks are shot at the same position on plain paper, for example. In such a case, that is, the outline color change occurs, the changing of the thinning process is effective. More specifically, in the case of the shots in the order of cyan ink and magenta ink, the thinning ratio for the magenta is made higher than that for the cyan, by which the boundary stripe can be suppressed more.

Thinning Process Area

In this embodiment, as has been described in the foregoing referring to FIG. 5A, the data of 4 raster areas at the sheet feeding side in one band are processed, and therefore, the data in the area of 16 dots in the main scan direction are processed. Furthermore, as shown in FIG. 5A, the 4 raster area is divided into 2 raster areas at the sheet discharge side (upper) and 2 raster areas at the sheet feeding side (lower). For each of the defined in the areas, the thinning rank can be selected, that is, different thinning rank graphs are prepared.

As will be understood from FIG. 5A, the thinning area and the dot count area used in this embodiment are not the same area, but only a part of the dot count area is the thinning area. It is not necessary that thinning area and the dot count area are the same.

This is because the causes of the production of the boundary stripe is not so simple that problem may be solved by the boundary per se, but it is considered that ink bleeding between the bands and the ink bleeding away from the portion by several raster lines propagates through chain reaction depending on the connections of the dots. For example, the boundary stripes are different between when the ink is ejected only for 4 raster lines at up to the boundary and when the ink is ejected for 8 raster lines. More particularly, the stripe is more remarkable in the latter. Because the ink bleeding occurring at the position several rasters away from the boundary gradually propagates with the result of the amount of the ink at the boundary is relatively large, and therefore, the boundary stripe is relatively remarkable. Therefore, it is desirable that dot count area is larger than the thinning area and is determined in consideration of the chain reaction propagation of the ink bleeding. In this embodiment, the dot count area twice as large as the thinning area.

As regards the size of the thinning area, it is desirable that it has a certain area from the standpoint of effectiveness of the processing. If, however, it is too large, the density may become too low due to the thinning process with the possible result of white stripe. In view of these factors and properties of thing, proper width of the thinning area is determined. In this embodiment, the thinning area has a width corresponding to the 4 raster areas (0.17 mm in the case of 600 dpi). This is effective to suppress the boundary stripe without inducing the white stripe.

In these embodiments, 4 raster lines are used for the thinning process area, and the area is divided into two parts. This is not limiting, and it may be divided into four parts, that is, the rank graphs are assigned to the respective raster lines.

By the further deviation of the thinning area and the independent assignment of the thinning table for each of the divided areas, proper thinning rates and the thinning areas can be selected depending on the degrees of the boundary stripes.

As described in the foregoing, the causes of the production of the boundary stripe are not so simple that chain reaction from the ink bleeding occurring at the position several raster lines away from the boundary is desirably taken into account. Therefore, it is more effective to process the neighborhood of the boundary in view of the ink bleeding than to process the boundary portion only. The one raster or two rasters at the boundary is a course of the production of the boundary stripe. The degree of the influence changes away from the boundary (by one raster line, two raster line, three raster line . . . ). Adjacent to the boundary, the raster lines in an area is concerned with the production of the boundary stripe, and the decrees of the influences are different.

In view of this, the thinning ranks are determined for the respective raster lines. In addition, the thinning ranks are determined in accordance with the distance from the boundary, by which the accuracy of the processing is improved.

SMS Thinning Process

In the SMS thinning process, the designated count (specified bit, for example, MSB in this embodiment) is read by the counter (register) each time the print data is supplied, if it is "1", the print datum is printed, and then the counter is shifted rightward by "1". If the counter "0", the print data is thinned, and then the counter is shifted rightward by "1". When the counter reaches the rightmost position, it is returned to the leftmost position. The process is repeated each time the print data it supplied, thus determining the dots to be skipped.

Referring to FIGS. 14A–D and FIGS. 15A–F, the SMS thinning process will be described In these figures, the print data are indicated by "o", and no la print datum is indicated by "x". The noting datum is indicated by bolding. As regards the counter value, the portion to be printed is indicated by "1", and the portion to be skipped is indicated by "0", and the column designated by the counter is indicated by bolding.

In FIG. 14A, the first print datum is "o", and the count is 0, and therefore, the first data is skipped or removed. Therefore, the first print datum after the processing is "x", and the counter shifts by one to the right (FIG. 14B). The next datum is not indicative of printing, and is maintained "x", and the counter does not shift and is retained there (FIG. 14C). The third print data has the counter value of "1", and the print datum remains, and the counter is shifted by one to the right. In this manner, the print data are skipped at the ratio of 1 out of 4 (FIG. 14D).

FIGS. 15A–F shows an example of the data before and after the thinning process in which the thinning process is effected in the area defined by 8 dots in the main scan direction and 4 raster lines in the sheet discharge direction (one half in the main scan direction) since the thinning process area is constituted by 4 raster lines, in this example, the thinning ranks are "2" at the sheet discharge and "4" at the sheet feeding side, respectively.

For the best understanding, the raster lines are called "first raster", "second raster", "third raster", "fourth raster" from the sheet discharge side in FIG. 15A.

The SMS thinning process is carried out from the sheet discharge side raster for each of the rasters. After the processing for one raster, the next raster is processed. The SMS counter does not return to the initial position even if the thinning level is changed. The SMS counter does not return to the initial position even if the thinning process area is shifted to the adjacent area within the same band, and the counter position is retained in one band. When the operations shifted into a different band, the counter position is returned to the initial position.

The initial position in the first process area in one band is randomly designated. As a result, the processing from the first raster to the fourth raster is as shown in FIG. 15B, and it is as shown in FIG. 15F as a whole.

According to this embodiment of the normal thinning process, the color area of the noting area is discriminated from the number (the number of dots to be printed) of the recording data neighborhood of the boundary, and in accordance with the color area, the thinning rank can be selected for each of the inks used. By effecting the thinning process for each of the inks in accordance with the set thinning rank, the degree of production of the boundary stripe in one-pass can be suppressed.

Delay Compensation Thinning Process

Figure 16:
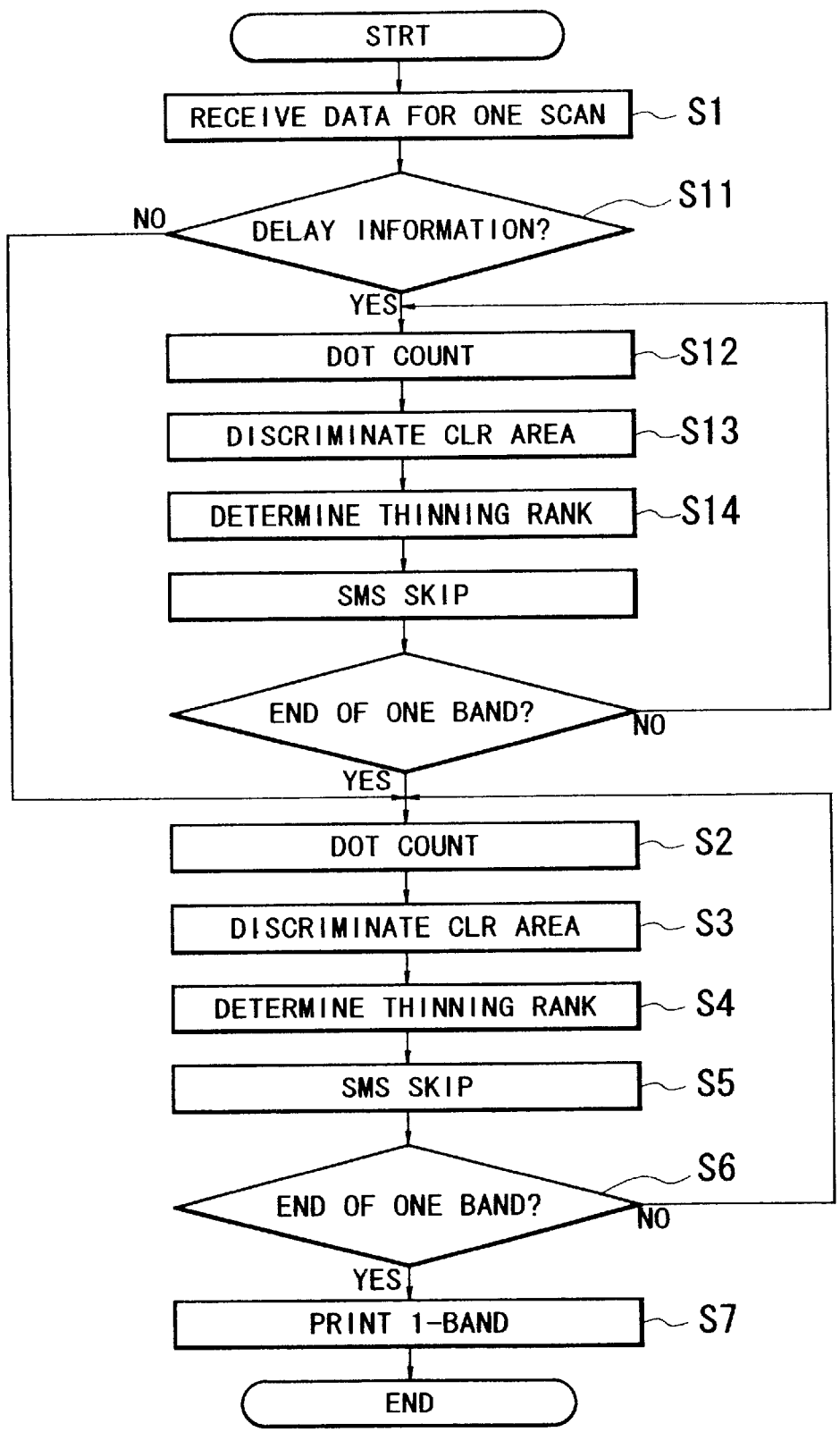
FIG. 16 is a flow chart for showing the steps in the delay compensation thinning process in the first embodiment of the present invention.

Next, the delay compensation thinning process, which is one of the characteristic aspects of the present invention, will be described. When an ordinary printing process is interrupted by the execution of a control for preventing the smearing of an image which occurs when a finished print is discharged, a control for preventing the head overheating, a pre-ejection process, or the like, which is different from the controls executed during an ordinary printing process, a delay compensation connecting process, which is different from the normal thinning process, is carried out, independently from the normal thinning process, on the basis of the information regarding the delay caused by the aforementioned controls and processes which are not executed in an ordinary printing process. FIG. 16 is a flow chart for this delay compensation connecting process. In this flow chart, the normal thinning process described with reference to FIG. 4 is shown along with the flow chart for the delay compensation connecting process.

When printing a portion of an image correspondent to a given band, an exact amount of print data for printing the portion of an image are received in step S1. In step S11, it is determined whether or not there was an unordinary delay after the printing of the portion of an image correspondent to the preceding band. More specifically, when the value in the counter of the timer 106 is no more than a predetermined value, for example, 0.8 (second), it is determined that there was no delay. The predetermined value is a value above which the delay between the preceding and following printing movement of a recording head in the primary scan direction results in the appearance of a conspicuous boundary stripe.

When no delay information is detected in step S11, a step S2 is taken, in which the previously described normal thinning process is carried. When delay information is detected in step S11, a step S12 is taken, in which the delay compensation thinning process is carried out.

Figure 17:
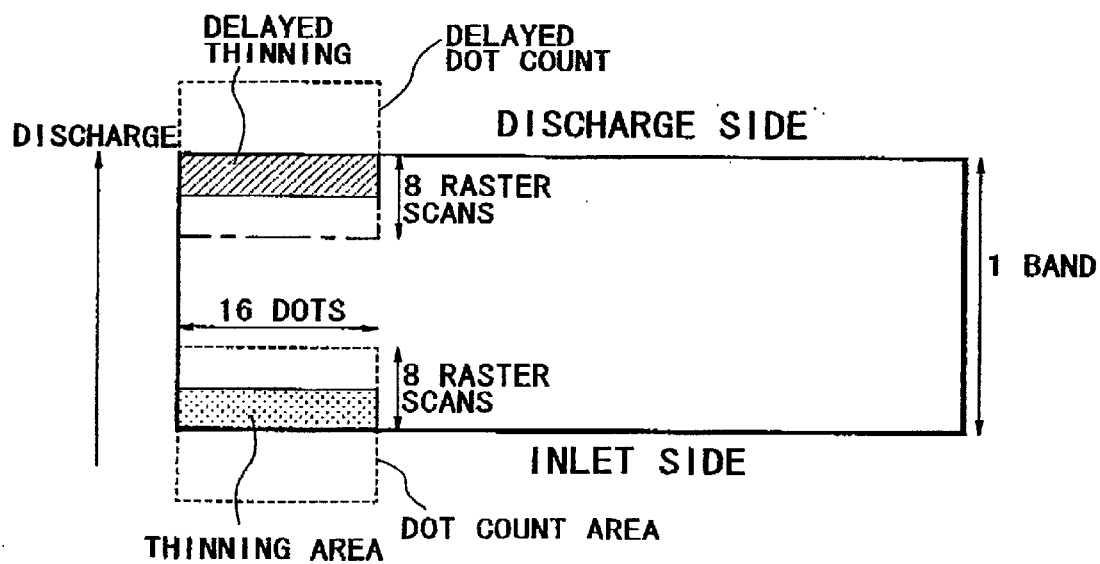
FIG. 17 is a schematic drawing for showing the area across which the thinning process is carried out, in the first embodiment of the present invention.

The dot counting in step S12 and the color designation in step S13 are carried out in the same manner as in the normal connecting process, except that the number of dots is obtained from the area shown in FIG. 17.

The method for setting a thinning level for the area across which this thinning process is carried out is the same as that for the normal connecting process. The relationship between the area across which the delay compensation connecting process is carried out when delay information is inputted, and the area (which hereinafter may be referred to as normal connecting process area) across which the normal connecting control is carried out on the basis of only data amount, is also shown in FIG. 17. The area from which the number of dots for the normal thinning process carried out for a given band is obtained is the same as the area from which the number of dots for the delay compensation connecting process is obtained for the immediately following band.

The thinning level selecting method carried out in step S14 is the same as the thinning level selecting method carried out for the normal thinning process, except that the thinning levels represented by dotted lines in FIGS. 12A–12F are used as the thinning rank graph. As is evident from the drawings, the thinning rank graphs used for the delay compensation thinning process are lower in level (low in thinning ratio) than those used for the normal thinning process. Further, the thinning level is set so that the thinning level for the upper portion of the area, that is, the portion closer to the boundary, across which the delay compensation thinning process is carried out, becomes higher than that for the lower portion, that is, the portion farther from the boundary. Here, the thinning level for the lower portion is set to "0". In other words, the thinning process is not carried out for the lower portion.

As described above, the provision of the delay compensation connecting process in which the thinning process is carried out, independently from the normal connecting process, only when the delay information is present, makes it possible to deal with the problem that the delay results in the formation of a worse boundary stripe.

Since the delay compensation connecting process is carried out independently from the normal connecting process, the normal connecting process and delay Compensation connecting process can be carried out at different times, improving the efficiency with which print data are processed by the CPU.

Further, the delay compensation connecting process can be differently dealt with from the normal connecting process; for example, the parameters for the delay compensation connecting process can be made different from those for the normal connecting process. In other words, more latitude is afforded by a simple structure.

Further, in this embodiment, the area, the print data of which are read for the delay compensation connecting process, is rendered greater in size than each band. Therefore, the data for certain portions of the area adjacent to the boundary are read more than once. Further, the dot counting area for the normal connecting process and the dot counting area for the delay compensation connecting process are made the same, and the same counting circuit is shared by both processes. However, the two dot counting areas may be different from each other. In such a case, the dots in the dot counting area for the delay compensation connecting process are counted only when the delay information is present. Also in such a case, the top and bottom edge portions of a given band may be designated as the areas across which the delay compensation connecting process and normal connecting process are carried out, respectively, so that the data for a single band will suffice for the dot counting.

Here, the reason why a boundary stripe becomes more conspicuous when there is the delay will be described. When the delay is short, the ink which is deposited during the printing of the preceding band will not have been completely fixed to a recording paper before inks will be deposited for printing the following band, and therefore, the ink which is overlaid onto the ink deposited during the printing of the preceding band fails to be well fixed to the surface of a recording paper.

On the other hand, when there is the delay, that is, when the delay between the printing of two adjacent bands is long, the following is possible That is, the ink deposited during the printing of the preceding band will have completely fixed to the recording paper. As a result, during the printing of the following band, ink is deposited onto, and is fixed to, the area of the recording paper, onto which ink or inks have been deposited during the printing of the preceding band and have been properly fixed. Therefore, the density of this area becomes higher.

It is also conceivable based on the above described principle that the boundary stripe is more conspicuous when there is a printing delay between two adjacent bands than when not. This phenomenon may be thought to be the same as the phenomenon that density becomes higher when an image is formed using a multi-pass method than when using a single-pass method.

In this embodiment, only a single thinning rank graph is provided, from which a thinning level is selected when the delay is no less than 0.8 second. However, a plurality of thinning rank graphs may be provided to deal with the delay, more precisely, depending upon the length of the delay; for example, when the delay is not more than 0.8 second (no delay compensation thinning process); no less than 0.8 second but not more than 2.0 seconds (delay compensation thinning rank 1); no less than 2.0 seconds but not more than 3.0 seconds (delay compensation thinning rank 2); and no less than 3.0 seconds (delay compensation thinning rank 3) When a plurality of thinning rank graphs such as the above are provided, it is desired that the delay compensation thinning rank 2 is higher in thinning rank (higher in thinning ratio) than the rank 1.

Further, the steps (up to the step in which the thinning level is selected) for obtaining the thinning data for the area across which the delay compensation connecting process is carried out may be always carried out along with the normal connecting process, so that whether or not the actual delay compensation connecting process is to be carried out can be determined in response to the absence or presence of the delay information.

According to the controlling method in this embodiment, even when there occurs a printing delay due to the interruption caused by the need for carrying out one or a plurality of the unordinary controls, the delay compensation is carried out independently from the ordinary connecting process. Therefore, it is possible to deal with the problem that the presence of the printing delay between two adjacent bands results in the formation of an image with more conspicuous boundary stripes, making it possible to obtain an image, the boundary stripes of which between two adjacent bands are far less conspicuous.

Second Embodiment

The second embodiment of the present invention is similar to the first embodiment in that printing is effected with the recording ink onto the recording material using a plurality of recording heads.

The structure of the recording device used in this embodiment, the thinning process area and the SMS thinning process in this embodiment are the same as those in the first embodiment.

Dot Count

In this embodiment, the dot count unit area is the same as that in the first embodiment. FIG. 18A shows a head structure used in this embodiment.

With this structure, the number of nozzles for ejecting the black ink is not less than twice as many as the number of color nozzles, so that when the data contain only black data, the black nozzles are fully used to raise the printing speed In the case of the mixture of black and chromatic data, the number of black nozzles to be actuated is reduced in order to suppress the bleeding among the black dots, and in the case of the black and color printing, at least one scan black is given. FIG. 18B schematically shows the printing of black data only, and FIG. 18C schematically shows the printing of black and chromatic data in mixture.

The boundary stripe tends to occur in the case of the color printing since the amount of the ink is large on the recording material. In this case, the black printing is carried out prior to the color printing with the nozzles structure in this embodiment. Therefore, at the time of the color printing, the black ink printing has already finished, and the black ink has started fixing on the recording material. For this reason, the black ink is not influential to the boundary stripe.

In this embodiment, the dot count is not carried out for the black ink, accordingly. But, the color inks (cyan, magenta and yellow) only are subjected to the dot count, for the boundary processing.

Color Area Discrimination

Figure 19:
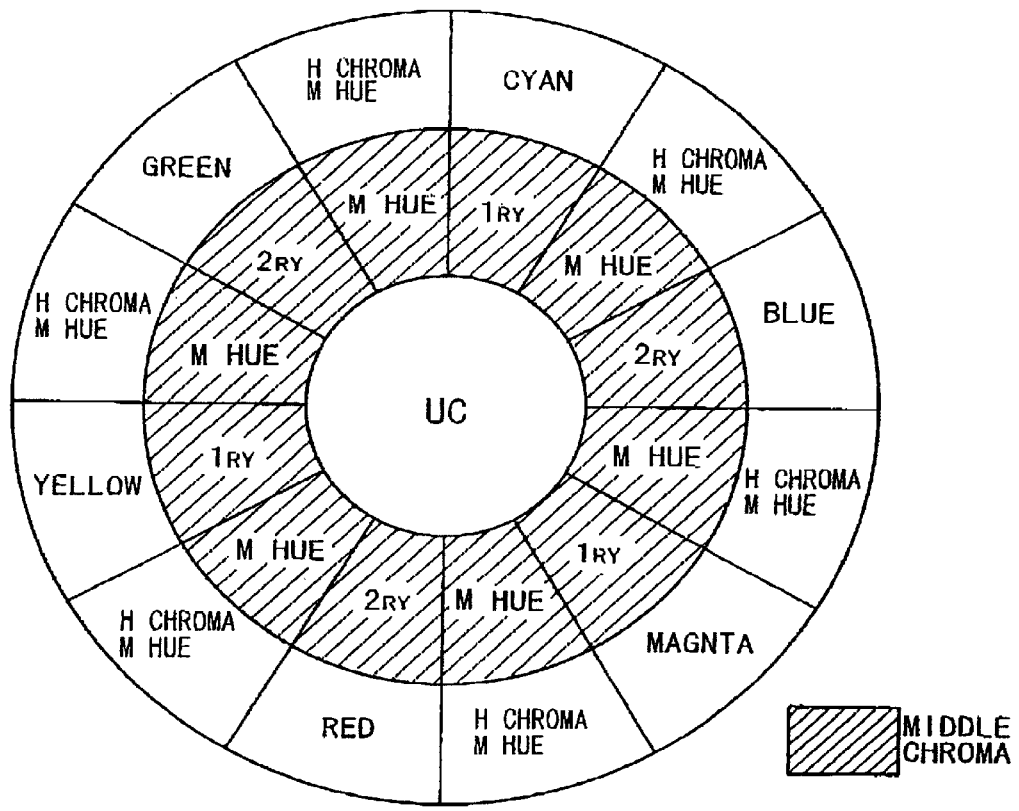
FIG. 19 shows an example of the sections of the color areas according to the second embodiment of the present invention.

The sections of the color areas are shown in FIG. 19.

An example of color area selection method will be described.

The hue direction selection will first be dealt with. Here, the hue direction represents the position on the outermost circumference in FIG. 19, that is, the primary color, the secondary color or the intermediate.

Figure 20A:
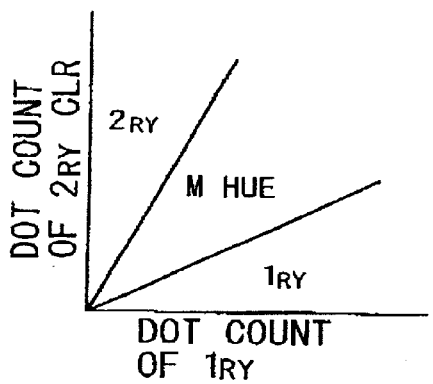
FIGS. 20A and 20B illustrate an example of a dividing method in a color area according to the second embodiment of the present invention.

In FIG. 20A, the abscissas are numbers of dots of the primary color, and the ordinates are numbers of dots of the secondary color. The classification for the primary color, the secondary color and the indicated color is as follows. The comparison is made between the number of dots of the primary color divided by 2 and the number of dots of the secondary color. If the former is larger, the hue thereof is classified into the primary color The comparison is made between the number of dots of the primary color and the number of dots of the secondary color divided by 2. If the latter is larger, the hue thereof is classified into the secondary color. Otherwise, it is classified into the intermediate hue.

Then, the chromaticity direction, that is, whether it is close to the center, close to the circumference or in the middle, in FIG. 19, is discriminated.

Figure 20B:
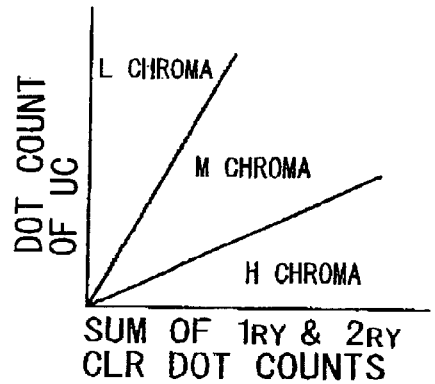

FIG. 20B shows a sum of the number of dotss of the primary color and secondary color vs. the number of dots of the UC (ordinates). The classification in the chromaticity direction is as follows. The comparison is made between the sum of the numbers of dots of the primary color and the secondary color divided by 2 and the number of dots of the UC, and if the former is larger, the chromaticity is closest to the circumference, and the area is determined as the color area of the dot count area.

The comparison is made between the sum of the number of dotss of the primary color and the secondary color divided by 2 and the number of dots of UC. If the latter is larger, the comparison is made between the number of dots of UC divided by 2 and the sun of the numbers of dots of the primary color and the secondary color, and if the former is larger, the chromaticity is closest to the center, and the area is determined as the color area of the dot count area. Otherwise, the intermediate area is selected.

The foregoing determination method of the hue and the chromaticity are summarized as follows. (hue direction)

If $D1/2>D2$, the primary color area is selected.

If $D2/2>D1$, the secondary color area is selected.

Otherwise, the intermediate hue area is selected.

Chromaticity Direction

If $(D1+D2)/2>UC$, the high chromaticity area (circumference side) is selected.

If $UC>(D1+D2)/2$, the low chromaticity area (center side) is selected.

Otherwise, the intermediate chromaticity area is selected.

In this manner, the color area is finely divided, the differences in the degree of the boundary stripe can be finely dealt with, and the behavior of each of the ink can be taken into account.

Thinning Rank Graph

FIGS. 21A–F show an example of a combination of the rank graphs used in this embodiment.

In this embodiment, the thinning ranks can be designated for 7 areas (cyan, magenta, yellow, blue, green, red and UC) of the color areas shown in FIG. 19, for the respective inks. The thinning rank graph for the intermediate areas other than those, are calculated from the graphs in the 7 areas. By doing so, the number of data of the rank graphs can be reduced.

In an example of calculating the graph, an average between the primary color and the secondary color is taken for the intermediate area in the hue direction, and a higher one of the thinning ranks of the high chromaticity and the low chromaticity, for the intermediate area in the chromaticity direction.

The number of thinning rank graph prepared in this embodiment is 7 (color areas)×3 (the number of links)×2 (the number of divisions of the thinning area)=42, in consideration of the designation of the thinning ranks and division of the thinning area into two divisions.

Among them, the thinning rank graphs for the blue color area are actually used when the result of the color area discrimination designates the dot count area of blue color. This is taken out, and is shown in FIGS. 21A–F. Similarly, the rank graph heads for the red color area is shown in FIGS. 22A–F.

The thinning rank graphs for the delay compensation thinning process similar to those in the first embodiment are represented by the broken lines in FIGS. 21 and 22. In either case, the delay compensation thinning process is not carried out for the lower portion; it is carried out only for the upper portion.

In the normal thinning process, the thinning level is selected with reference to these thinning rank graphs and on the basis of the total number of dots. In comparison, the delay compensation thinning process is carried out only when the delay information indicates that the delay is no less than 0.8 second.

Thus, the thinning rank graphs are not designated for all the divided color areas, but the basic ones are designated, and the graph is calculated out for the intermediated areas, so that amount of the data can be reduced.

In both the delay compensation thinning process and normal thinning process, the SMS thinning process is carried out for the unit areas, similarly to the first embodiment, after the rank determination. These processes are carried out for one band, and then, the printing for one scan is carried out.

Figure 21A:
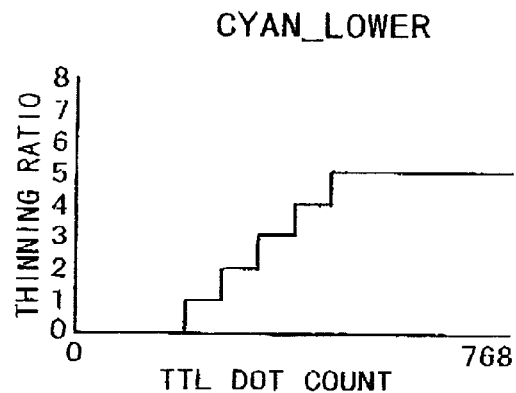
FIGS. 21A–21F show an example of a thinning rank graph according to THE second embodiment of the present invention.
Figure 21B:
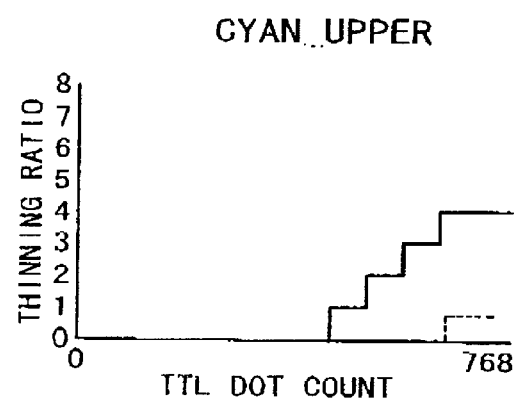
Figure 21C:
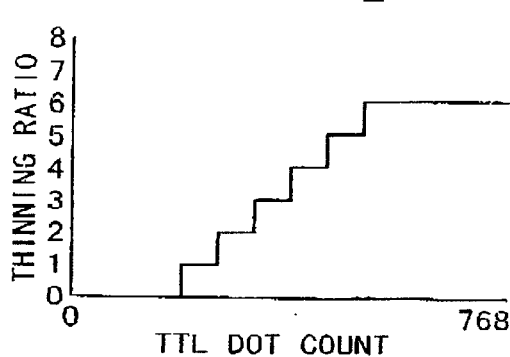
Figure 21D:
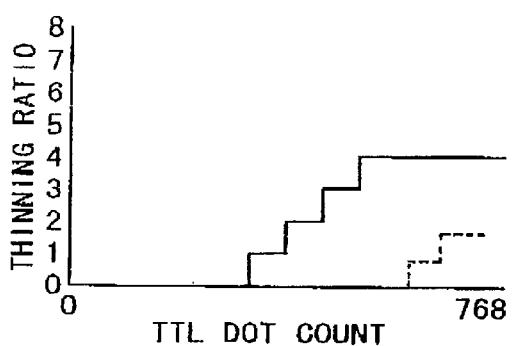
Figure 21E:
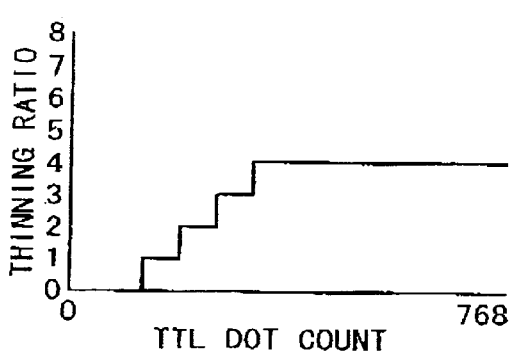
Figure 21F:
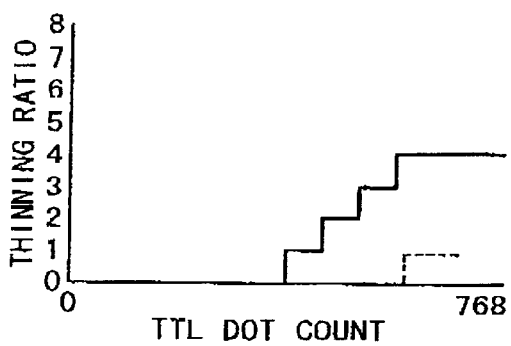

Referring to FIGS. 21A, C, the description will be made as to the thinning process in the gradation from the white to the UC (under color, a color mixture of YMC) through the blue (the same as with the foregoing example).

Where the color is toward the blue, the printing is carried out using the cyan ink and the magenta ink, and at the point where the blue is maximum, the cyan and magenta data are indicative of solid print (maximum duty data), that is, level 512 in this example. In the state, the color area of the unit area is blue, and in order to suppress the production of the boundary stripe, rank 5 thinning (FIG. 21A) which is high is effected to the cyan lower, and rank 6 (FIG. 21C) which is also high is effected to the magenta lower.

Figure 22A:
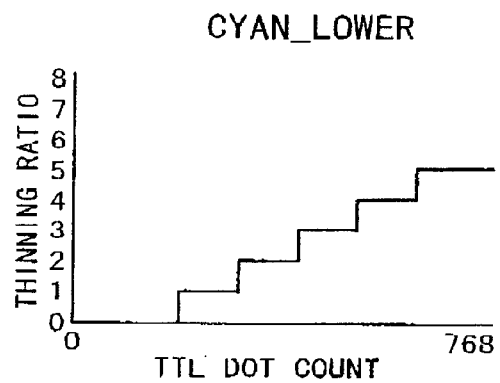
FIGS. 22A–22F are examples of a thinning rank graph according to the second embodiment of the present invention.
Figure 22B:
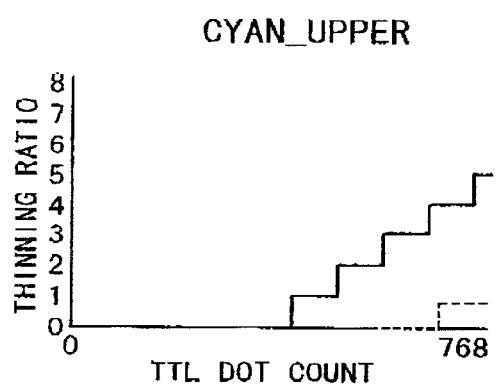
Figure 22C:
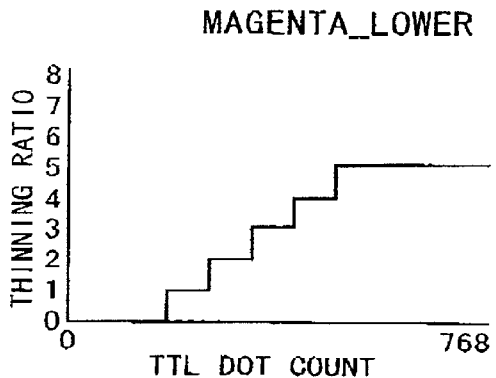
Figure 22D:
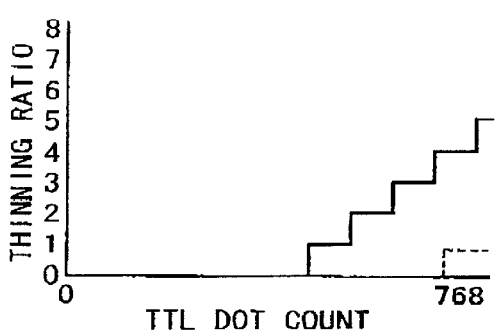
Figure 22E:
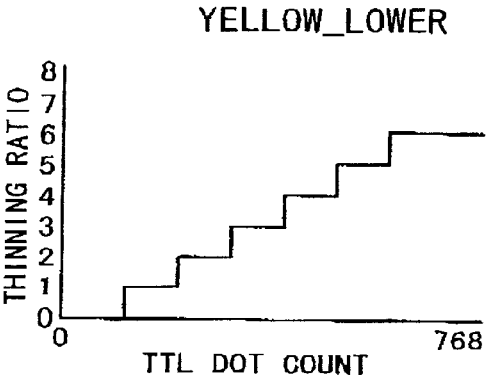
Figure 22F:
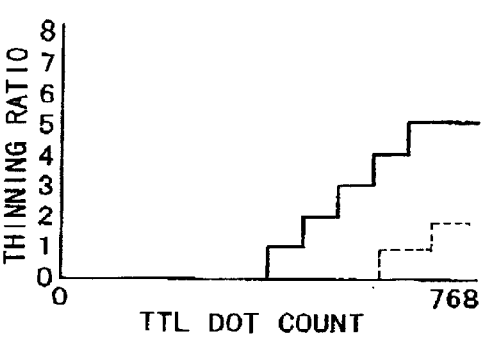
Figure 23:
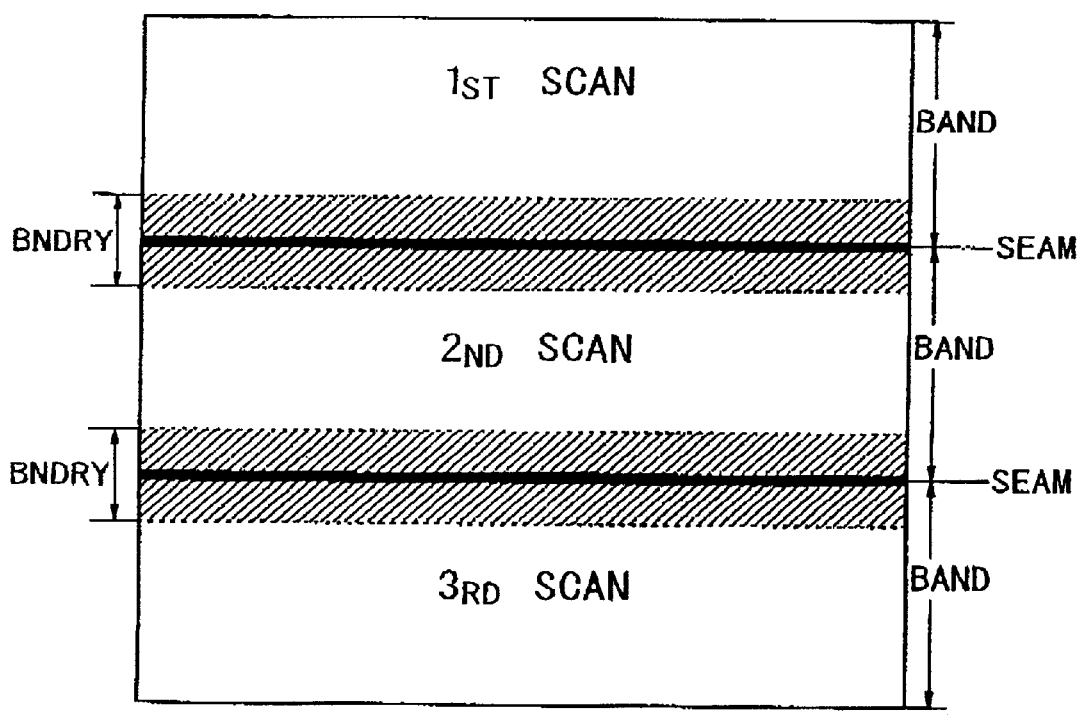
FIG. 23 is a schematic view illustrating a band and boundary.

Referring to FIGS. 22A, C, the description will be made as to the case of degradation from white through red to UC. Then, the cyan ink is first started to be used at the point of change from the red at the maximum to the UC. The amount of the ejected ink at that point is the maximum for each of the magenta and yellow colors, similarly to the portion from the blue to the black in the white-blue-black example, that is, level 512, and the color area is red of course. Therefore, the cyan lower is subjected to the thinning process with rank 3 (FIG. 22A) thinning rate, and the magenta lower is subjected to the thinning process with rank 5 (FIG. 22C) thinning rate. At this time, the cyan dots which are sparse other start of the reception of the data, the relatively low rank (rank 3) thinning is carried out, and therefore, no lack of cyan dot is remarkable.

In the first and second embodiments, the used dot count unit area is 16 dots×16 raster lines (sub-scan direction). However, the size is not limiting, and the size of the unit area is properly determined by one skilled in the art in consideration of the conspicuousness of the boundary stripe, the load added by the data process, the output resolution or the like.

In the first and second embodiment, the number of dots is obtained from an area, such as the area shown in FIG. 5, which extends across the boundary between two adjacent bands. However, the area from which the number of dots is obtained does not need to be limited to such an area as the area shown in FIG. 5. For example, it may be only the bottom edge portion of the preceding band. Also, the thinning process may carried out across the adjacencies of the boundary between any two adjacent bands, on the basis of such number of dots that is obtained from only the top edge portion of the following band.

The position where the SMS thinning process is carried out, is not limited to the bottom end portion of the prior scan, but it may be the top end of the later scan, or both, that is, astride the boundary between adjacent bands.

It is desirable that most appropriate dot count area and SMS thinning process area can be selected on the basis of combination of the recording material and the recording ink. For this reason, the dot count area and/or the SMS is changeable responding to the recording material used.

The number of color areas with the above is two in this embodiment, but the number is not limiting.

In this embodiment, the one path printing is the basic mode, since in that mode, the boundary stripe production is most conspicuous. However, the boundary stripe is more or less produced in the multi-path printing The thinning process is preferable in the multi-path printing with the thinning rank graph corresponding to the number of paths for the multi-path mode.

The boundary stripe is caused mainly by the bleeding of the recording ink on the recording material, and therefore, the boundary stripe is more conspicuous under the high temperature and high humidity ambience since then the degree of the recording ink bleeding is higher. In view of this, it is preferable that plurality of threshold levels for switching the thinning rank graph and the thinning area, are provided which are selectable depending on the ambient conditions.

In the foregoing embodiment, the recording ink used are cyan, magenta, yellow and black inks. However, the present invention is applicable to the system using so-called photo-ink which is diluted regular ink.

In the foregoing description, the data relating to the amount of ejection for each of inks are binary data, but the present invention is not limited to this. The data may be R, B, G multi-level data, if the data correspondent to the amount of the ink ejected. In this case, the amount of the ink is not limited to the reduction by thinning the data, but may be multiplication of reduction coefficients to the multi-level data.

Further, the amount of the data equivalent to the entirety of a given raster line may be obtained to be taken into consideration when calculating the interval in time between two adjacent bands. This is for the following reason. That is, since it takes a certain length of time for a carriage to be moved across each raster line, the interval in time between the scanning of any two adjacent bands, which affects the conspicuousness of a boundary stripe, is affected by carriage speed and/or recording medium width. Also, when an image is bidirectionally printed, the interval in time between the scanning of the preceding and following bands of any two adjacent bands is drastically affected by the recording position and scanning direction. Thus, these factors may be taken into consideration when calculating the interval in time between the scanning of the preceding and following bands of any two adjacent bands. In such cases, it is easier to set the delay compensation thinning level for each unit area, provided that each band has been divided into a plurality of unit areas as described above, making it possible to carry out the delay compensation thinning process, within the boundary of each band.

Further, in this embodiment, each unit area is given a color designation, and the thinning process is carried out on the basis of this color designation. However, the present invention is not limited by this embodiment. In other words, the thinning process may be carried out on the basis of a combination of the print duty for the adjacencies of the boundary between two adjacent bands, and the interval in time between the scanning of two adjacent bands. Also, it may be carried out on the basis of only the interval in time between the scanning of two adjacent bands.

Figures 26A, 26B, 26C:
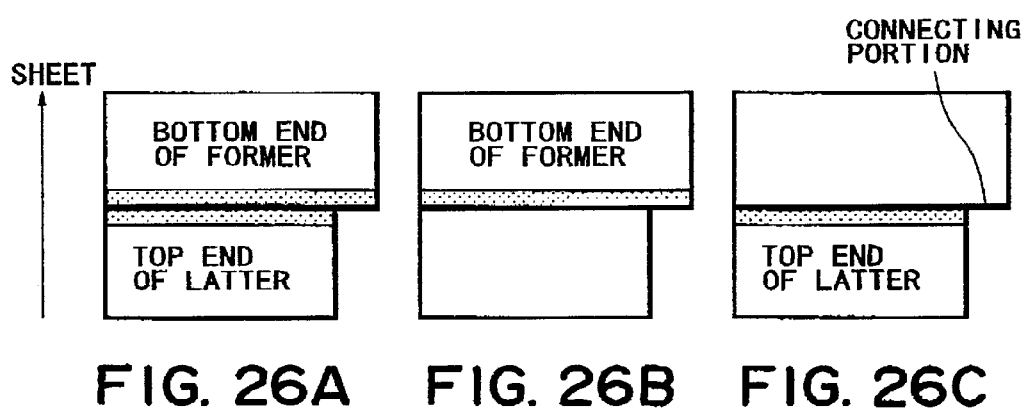
FIGS. 26A–26C are schematic illustrations for showing the areas across which the thinning process in accordance with the present invention may be carried out.

In the preceding embodiments, of any two adjacent bands, the normal thinning process is carried out for the bottom edge portion of the preceding band, and the delay compensation thinning process is carried out for the top edge portion of the following band, as shown in FIG. 26A. However, the present invention is not limited by this arrangement.

In other words, both the normal thinning process and delay compensation thinning process may be carried out across the bottom edge portion of the preceding band, as shown in FIG. 26B, or across the top edge portion of the following band, as shown in FIG. 26C. Carrying out both thinning processes across the same portion has an advantage in that the time required for carrying out the thinning processes becomes shorter, and also that the apparatus structure becomes simpler.

On the other hand, the method depicted by FIG. 26B is premised upon a hypothesis that the information regarding the delay be obtained prior to the beginning of an actual printing operation. However, there are many causes for the delay. The length of the delay between the scanning of two adjacent bands, which is caused by the smear prevention control or the like, can be estimated by reading the print data in advance. However, it is difficult to precisely estimate the length of the delay caused by temperature increase, waiting time for data transmission, waiting time for quantization, and/or the like.

It is possible to use the method depicted by FIG. 26C, in which the thinning process is carried out after the occurrence of the delay. However, the thinning process is more significantly affected by the type of recording paper when it is carried out across the top edge portion of the following band than when it Is carried out across the bottom edge portion of the preceding band. Therefore, it is difficult to effectively carry out the thinning process after the occurrence of the delay.

In comparison, in the case of the method depicted by FIG. 26A, the data does not need to be read in advance to calculate the length of the delay, and the delay compensation thinning process can be carried out, independently from the normal thinning process, when the delay occurs. Thus, the method depicted by FIG. 26A may be said to be more effectively carried out compared to the others.

As described above, the delay compensation thinning process in accordance with the present invention can be carried out even when the portion of a given scanning band, on the sheet feeding side, is not designated as the area across which the normal connecting process is carried, that is, even when the portion of a given scanning band, on the sheet discharging side, is designated as the area across which the normal connecting process is carried out. In such a case, the area which has been subjected once to the normal connecting process may be subjected again to the process. Also in such a case, the normal thinning process and delay compensation thinning process do not need to be rendered the same in terms of the selection of an area across which the processes are carried out, and the parameter for the thinning process, which is obvious.

Others

The present invention is very effective when used with an ink jet recording system, in particular, when used with an ink jet recording head which comprises a means for generating thermal energy (for example, electrothermal transducer, or a laser) used for ejecting ink, and in which the state of ink is changed by the thermal energy, and also a recording apparatus employing such an ink jet recording head. This is due to the fact that according to such a recording system, recording can be made at high density, and a highly precise image can be formed.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the the bubble, the liquid (ink) is ejected through an ejection outlet to produce at least one droplet. The driving signal is preferably in the form of a pulse, because the development and contraction of the bubble can be effected instantaneously, and therefore, the liquid, (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. AS for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature Since the ink is controlled within the temperature not lower than 30 SUPo/SUPC and not higher than 70 SUPo/SUPC to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

As described above, according to the present invention, the amount by which the ink to be deposited across the adjacencies of the boundary between any two scanning bands is reduced, is determined on the basis of the information regarding the interval in time between two adjacent scanning bands. Therefore, it is possible to form an image, the boundary stripes of which are far less conspicuous, even when the interval in time between two adjacent scanning bands is not constant.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording apparatus for effecting recording on a recording material by ejecting ink through a plurality of ejection outlets in units of bands with relative scanning movement between a recording head and the recording material, said ink jet recording apparatus comprising:

obtaining means for obtaining scanning interval information relating to a time period required for recording a connecting portion between a band of a certain scan of the recording head and a band of the next scan of the recording head; and reducing means for reducing an amount of the ink ejected to a neighborhood of the connecting portion on the basis of the scanning interval information obtained by said obtaining means.

2. An apparatus according to claim 1, wherein the scanning interval information is a delay time for which said recording head is at rest between the certain and next scans.

3. An apparatus according to claim 1, wherein the scanning interval information includes a recording position and a direction of scan of the recording head.

4. An apparatus according to claim 1, wherein the scanning interval information is an amount of data of the band.

5. An apparatus according to claim 1, wherein said reducing means reduces the amount of the ink ejected to the neighborhood of the connecting portion when a scanning interval time period indicated by the scanning interval information obtained by said obtaining means is not less than a predetermined time period.

6. An apparatus according to claim 1, wherein an amount of reduction of an amount of the ink ejected to the neighborhood of the connecting portion increases with increase of a scanning interval indicated by the scanning interval information obtained by said obtaining means.

7. An ink jet recording apparatus for effecting recording on a recording material by ejecting a plurality of ink droplets in units of bands with relative scanning movement between a recording head and the recording material, said ink jet recording apparatus comprising:

obtaining means for obtaining scanning interval information relating to a time period required for recording a connecting portion between a band of a certain scan of the recording head and a band of the next scan of the recording head;

obtaining means for obtaining relative information indicative of a relation of amounts of inks ejected in each of unit areas provided by dividing a neighborhood of a connecting portion between adjacent bands scanned by the recording head;

determining means for determining, for each of the inks, a reduction rate at which an amount of the ink ejected to the neighborhood of the connecting portion in the unit area, on the basis of the relative information for each of the unit areas obtained by said obtaining means and amount information indicative of the amount of each of the inks ejected to the unit area; and reducing means for reducing the amount of the ink ejected to the neighborhood of the connecting portion at the reduction rate determined by said determining means when a scanning interval time period indicated by the scanning interval information obtained by said obtaining means is not less than a predetermined time period.

8. An apparatus according to claim 7, wherein said obtaining means obtains the amount of each of the inks by counting the number of binary data, and the reduction rate is a thinning rate for the binary data, and wherein said reducing means thins the binary data at the thinning rate.

9. An ink jet recording method for effecting recording on a recording material by ejecting a plurality of ink droplets in units of bands with relative scanning movement between a recording head and the recording material, said ink jet recording method comprising the steps of:

obtaining scanning interval information relating to a time period required for recording a connecting portion between a band of a certain scan of the recording head and a band of the next scan of the recording head;

obtaining relative information indicative of a relation of amounts of inks ejected in each of unit areas provided by dividing a neighborhood of a connecting portion between adjacent bands scanned by the recording head;

determining, for each of the inks, a reduction rate at which an amount of the ink ejected to the neighborhood of the connecting portion in the unit area, on the basis of the relative information for each of the unit areas obtained in said obtaining step and amount information indicative of the amount of each of the inks ejected to the unit area; and reducing the amount of the ink ejected to the neighborhood of the connecting portion at the reduction rate determined in said determining step when a scanning interval time period indicated by the scanning interval information obtained in said obtaining step is not less than a predetermined time period.

10. A recording apparatus for effecting printing by ejecting recording ink onto a recording material by a recording head, comprising:

a normal connecting process unit;

a time obtaining unit, adapted to obtain a delay time; and a delay connecting process unit, wherein said delay connecting process unit effects a delay connecting process only when delay time information is obtained.

11. An apparatus according to claim 10, wherein said normal connecting process unit includes a normal obtaining unit for obtaining the number of data in each of unit areas provided by dividing print data for a neighborhood of a connecting portion in data of a band scanned through one scan of the recording head, the unit areas containing a predetermined number of pixels said apparatus further comprising:

a normal color gamut discrimination unit for determining a color gamut of a noted unit area from the number of data for each color obtained by said time obtaining unit;

a normal thinning area setting unit for designating an area to be subjected to a thinning process;

a normal setting unit for setting a thinning rank in accordance with the number of data obtained by said time obtaining unit and the color gamut discriminated by said normal color gamut discriminating unit; and a normal thinning process unit for thinning the print data in accordance with the thinning rank set by said normal setting unit.

12. An apparatus according to claim 11, wherein said delay connecting process unit includes an ambient temperature information obtaining unit for obtaining ambient temperature information, and the thinning tank set by said normal setting unit is changed in accordance with an output of said ambient temperature information obtaining unit.

13. An apparatus according to claim 10 or 11, wherein said normal connecting process unit includes a delay obtaining unit for obtaining the number of data in each of unit areas provided by dividing print data for a neighborhood of a connecting portion in data of a band scanned through one scan of the recording head, independently of said normal connecting process unit, the unit areas containing a predetermined number of pixels; said apparatus further comprising:

a delay color gamut discrimination unit for determining a color gamut of a noted unit area from the number of data for each color obtained by said obtaining unit;

a thinning area setting unit for designating an area to be subjected to a thinning process;

a delay setting unit for setting a thinning rank in accordance with the number of data obtained by said time obtaining unit and the color gamut discriminated by said delay color gamut discriminating unit: and a delay thinning process unit for thinning the data in accordance with the thinning rank set by said delay setting unit.

14. An apparatus according to claim 10 or 11, wherein said time obtaining unit and said normal color gamut discriminating unit are common to said normal connecting process unit and said delay connecting process unit.

15. A recording apparatus according to claim 10 or 11, wherein said delay connecting process unit changes a thinning rank set by said normal setting unit.

16. An apparatus according to claim 10, wherein the recording is effected by ejecting the recording ink to the recording material, and said delay connecting process unit includes a data reading unit for reading data of an area requited by production of data for one band, independently of said normal connecting process unit; said apparatus further comprising:

an obtaining unit for obtaining the number of data in each of unit areas provided by dividing print data of a neighborhood of a connecting area between adjacent scans in the data of one band scanned through one scan of the recording head, wherein each of the unit areas contains a predetermined number of pixels:

a color gamut discrimination unit for discriminating a color gamut of a noted unit area from the number of data for each color obtained by said obtaining unit;

a thinning area setting unit for designating all area to be subjected to a thinning process;

a setting unit for selling a thinning rank in accordance with the number of data obtained by said obtaining unit and the color gamut discriminated by said color gamut discrimination unit and for changing the thinning rank in accordance with a print direction in accordance with a recording position and a recording direction of the print data on the recording material; and a thinning process unit for thinning the print data in accordance with the thinning rank set by said setting unit.

17. An ink jet recording method for effecting recording on a recording material by ejecting ink through a plurality of ejection outlets in units of bands with relative scanning movement between a recording head and the recording material, said method comprising the steps of:

obtaining scanning interval information relating to a time period required for recording a connecting portion between a band of a certain scan of the recording head and a band of the next scan of the recording head; and reducing an amount of the ink ejected to a neighborhood of the connecting portion on the basis of the scanning interval information obtained in said obtaining step.

* * * * *

UNITED STATES PATENT AND TRADEMARK OFFICE
CERTIFICATE OF CORRECTION

PATENT NO. : 6,729,710 B2
DATED : May 4, 2004
INVENTOR(S) : Toshiyuki Chikuma et al.

It is certified that error appears in the above-identified patent and that said Letters Patent is hereby corrected as shown below:

Title page,
Item [30], Foreign Application Priority Data, "2000/300186" should read
-- 2000-300186 --.

Drawings,
Sheet 4, Figure 4, "STRT" should read -- START --.
Sheet 6, Figure 7, "STRT" should read -- START --.
Sheet 13, Figure 16, "STRT" should read -- START --.

Column 1,
Line 11, "let" should read -- jet --;
Line 17, "Present" should read -- present --;
Line 29, "can" should be deleted; and
Line 31, "can" (first occurrence) should be deleted.

Column 2,
Line 66, "bead" should read -- head. --.

Column 4,
Line 47, "THE" should read -- the --.

Column 5,
Line 52, "5A, B," should read -- 5A-B, --; and
Line 66, "targeted" should read -- targeted. --.

Column 6,
Line 9, "process" should read -- process. --.

Column 7,
Line 4, "may" should read -- many --;
Line 18, "Counter" should read -- counter --; and
Line 60, "os" should read -- of --.

Column 8,
Line 2, "((8" should read -- (8 --; and
Line 18, "software" should read -- software. --.

UNITED STATES PATENT AND TRADEMARK OFFICE
CERTIFICATE OF CORRECTION

PATENT NO. : 6,729,710 B2
DATED : May 4, 2004
INVENTOR(S) : Toshiyuki Chikuma et al.

It is certified that error appears in the above-identified patent and that said Letters Patent is hereby corrected as shown below:

Column 9,
Line 18, "to Details" should read -- as to the details --.

Column 10,
Line 67, "heater-142" should read -- heater 142 --.

Column 11,
Line 28, "S7" should read -- S7. --.

Column 12,
Line 8, "account." should read -- account). --;
Line 12, "nozzles." should read -- nozzles). --;
Line 23, "Sin.)," should read -- 8 in.), --;
Line 39, "Possible" should read -- possible --;
Line 45, "Possi-" should read -- possi --; and
Line 48, "13A,B," should read -- 13A-B, --.

Column 13,
Line 30, "D@" (both occurrences) should read -- D2 -- and "K!" should read -- D1 -- and "And" should read -- and --; and
Line 32, "(step S33). (Thinning rand graph)" should read -- (step S33). ¶ Thinning Rank Graph --.

Column 15,
Line 1, "twice" should read -- is twice --;
Line 8, "of thing," should be deleted;
Line 47, "counter "0"," should read -- counter is 0 --;
Line 54, "described" should read -- described. --; and
Line 55, "1a" should be deleted.

Column 17,
Line 47, "Compensation" should read -- compensation --.

Column 19,
Line 17, "speed" should read -- speed. --;
Line 52, "color" should read -- color. --; and
Line 61, "dotss" should read -- dots --.

UNITED STATES PATENT AND TRADEMARK OFFICE
CERTIFICATE OF CORRECTION

PATENT NO.    : 6,729,710 B2
DATED         : May 4, 2004
INVENTOR(S)   : Toshiyuki Chikuma et al.

It is certified that error appears in the above-identified patent and that said Letters Patent is hereby corrected as shown below:

Column 20,
Line 4, "dotss" should read -- dots --.

Column 21,
Line 7, "21A,C," should read -- 21A-C, --;
Line 20, "22A,C," should read -- 22A-C, --; and
Line 67, "printing" should read -- printing. --.

Column 23,
Line 19, "is-carried" should read -- is carried --; and
Line 20, "Is" should read -- is --.

Column 24,
Line 48, "AS' should read -- As --.

Column 25,
Line 1, "temperature" should read -- temperature. --.

Column 28,
Line 2, "unit:" should read -- unit; --;
Line 3, "data" should read -- print data --;
Line 25, "pixels:" should read -- pixels; --;
Line 29, "all" should read -- an --; and
Line 31, "selling" should read -- setting --.

Signed and Sealed this

Sixteenth Day of November, 2004

JON W. DUDAS
*Director of the United States Patent and Trademark Office*